(12) United States Patent
Shimotani et al.

(10) Patent No.: US 9,153,244 B2
(45) Date of Patent: *Oct. 6, 2015

(54) VOICE ANALYZER

(75) Inventors: Kei Shimotani, Kanagawa (JP); Yohei Nishino, Kanagawa (JP); Hirohito Yoneyama, Kanagawa (JP); Kiyoshi Iida, Kanagawa (JP); Akira Fujii, Kanagawa (JP); Haruo Harada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 604 days.

This patent is subject to a terminal disclaimer.

(21) Appl. No.: 13/475,378

(22) Filed: May 18, 2012

(65) Prior Publication Data

US 2013/0166299 A1 Jun. 27, 2013

(30) Foreign Application Priority Data

Dec. 26, 2011 (JP) ................................. 2011-283452

(51) Int. Cl.
*G10L 15/00* (2013.01)
*G10L 25/84* (2013.01)
(Continued)

(52) U.S. Cl.
CPC ................. *G10L 25/84* (2013.01); *G10L 17/00* (2013.01); *G10L 21/02* (2013.01); *H04R 3/005* (2013.01)

(58) Field of Classification Search
CPC ................... G10L 15/20; G10L 17/00; G10L 2021/02082; G10L 15/24; G10L 2021/02165; G10L 21/0208; G10L 25/78; G10L 21/02; G10L 25/51; G10L 25/84; H04R 25/407; G10K 11/1782

USPC .............. 704/231, 270, 270.1, 246, 236, 215, 704/E15.039, E15.041, E17.004; 381/330, 381/57, 94.1, 66, 92
See application file for complete search history.

(56) References Cited

U.S. PATENT DOCUMENTS 4,581,758 A * 4/1986 Coker et al. ..................... 381/56
5,031,881 A * 7/1991 Thurmston ..................... 254/28
(Continued)

FOREIGN PATENT DOCUMENTS

JP S61-072500 A 4/1986
JP A-62-141594 6/1987
(Continued)

OTHER PUBLICATIONS

Jun. 6, 2014 Office Action issued in U.S. Appl. No. 13/412,214.
(Continued)

*Primary Examiner* — Abdelali Serrou
(74) *Attorney, Agent, or Firm* — Oliff PLC

(57) ABSTRACT

A voice analyzer includes an apparatus body, a strap that is connected to the apparatus body and is used to hang the apparatus body from a neck of a user, a first voice acquisition unit provided in the strap or the apparatus body, a second voice acquisition unit provided at a position where a distance of a sound wave propagation path from a mouth of the user is smaller than a distance of a sound wave propagation path from the mouth of the user to the first voice acquisition unit, and an identification unit that identifies a sound, in which first sound pressure acquired by the first voice acquisition unit is larger by a predetermined value or more than second sound pressure acquired by the second voice acquisition unit, on the basis of a result of comparison between the first sound pressure and the second sound pressure.

5 Claims, 17 Drawing Sheets

(51) Int. Cl.
  *G10L 17/00* (2013.01)
  *H04R 3/00* (2006.01)
  *G10L 21/02* (2013.01)

(56) References Cited

U.S. PATENT DOCUMENTS

| | | | |
|---|---|---|---|
| 5,033,089 A | 7/1991 | Fujimoto et al. | |
| 5,778,082 A * | 7/1998 | Chu et al. | 381/92 |
| 5,793,875 A | 8/1998 | Lehr et al. | |
| 6,263,836 B1 | 7/2001 | Hollis | |
| 6,513,532 B2 | 2/2003 | Mault et al. | |
| 6,549,792 B1 | 4/2003 | Cannon et al. | |
| 6,956,564 B1 | 10/2005 | Williams | |
| 7,171,007 B2 * | 1/2007 | Rajan | 381/92 |
| 7,246,033 B1 | 7/2007 | Kudo | |
| 7,312,981 B2 | 12/2007 | Carroll | |
| 7,409,065 B2 * | 8/2008 | Lo | 381/92 |
| 7,526,094 B2 * | 4/2009 | Hickling | 381/91 |
| 8,005,672 B2 * | 8/2011 | Vierthaler et al. | 704/233 |
| 8,019,386 B2 * | 9/2011 | Dunn et al. | 455/563 |
| 8,031,881 B2 | 10/2011 | Zhang | |
| 8,121,673 B2 * | 2/2012 | Tran | 600/509 |
| 8,155,328 B2 * | 4/2012 | Kotegawa et al. | 381/57 |
| 8,155,345 B2 * | 4/2012 | Tagawa et al. | 381/92 |
| 8,442,833 B2 * | 5/2013 | Chen | 704/270 |
| 8,525,654 B2 * | 9/2013 | Yoshizawa et al. | 340/435 |
| 8,553,903 B2 * | 10/2013 | Greywall | 381/92 |
| 8,855,331 B2 | 10/2014 | Iida et al. | |
| 2001/0034250 A1 | 10/2001 | Chadha | |
| 2004/0064056 A1 * | 4/2004 | Ogura | 600/490 |
| 2005/0027515 A1 * | 2/2005 | Huang et al. | 704/215 |
| 2007/0136064 A1 | 6/2007 | Carroll | |
| 2008/0317260 A1 * | 12/2008 | Short | 381/92 |
| 2009/0076827 A1 | 3/2009 | Bulitta et al. | |
| 2009/0164219 A1 | 6/2009 | Yeung et al. | |
| 2009/0185696 A1 * | 7/2009 | Horibe et al. | 381/120 |
| 2009/0190769 A1 * | 7/2009 | Wang et al. | 381/66 |
| 2010/0214086 A1 * | 8/2010 | Yoshizawa et al. | 340/435 |
| 2010/0303254 A1 * | 12/2010 | Yoshizawa et al. | 381/92 |
| 2011/0091056 A1 * | 4/2011 | Nishizaki et al. | 381/312 |
| 2011/0103617 A1 * | 5/2011 | Shin | 381/107 |
| 2011/0176690 A1 * | 7/2011 | Takano et al. | 381/92 |
| 2011/0255702 A1 * | 10/2011 | Jensen | 381/66 |
| 2011/0293103 A1 * | 12/2011 | Park et al. | 381/57 |
| 2013/0024196 A1 * | 1/2013 | Ganong et al. | 704/246 |
| 2013/0166299 A1 | 6/2013 | Shimotani et al. | |
| 2013/0173266 A1 | 7/2013 | Nishino et al. | |
| 2013/0272540 A1 | 10/2013 | Hgren et al. | |
| 2013/0297319 A1 * | 11/2013 | Kim | 704/275 |
| 2014/0010397 A1 | 1/2014 | Merks | |

FOREIGN PATENT DOCUMENTS

| | | |
|---|---|---|
| JP | A-62-141595 | 6/1987 |
| JP | A-63-165900 | 7/1988 |
| JP | A-63-226691 | 9/1988 |
| JP | A-7-191688 | 7/1995 |
| JP | H08-191496 A | 7/1996 |
| JP | 2000-338987 A | 12/2000 |
| JP | 2002-006874 A | 1/2002 |
| JP | 2002-149191 A | 5/2002 |
| JP | 2006-023773 A | 1/2006 |
| JP | 2006-071936 A | 3/2006 |
| JP | 2008-072158 A | 3/2008 |
| JP | 2009-108868 A | 5/2009 |
| WO | 2006/028587 A2 | 3/2006 |

OTHER PUBLICATIONS

Sep. 11, 2014 Office Action issued in U.S. Appl. No. 13/565,365.
Nov. 19, 2014 Office Action issued in U.S. Appl. No. 13/465,230.
U.S. Appl. No. 13/565,365, filed Aug. 2, 2012 in the name of Yoneyama et al.
U.S. Appl. No. 13/465,230, filed May 7, 2012 in the name of Nishino et al.
U.S. Appl. No. 13/412,214, filed Mar. 5, 2012 in the name of Harada et al.

* cited by examiner

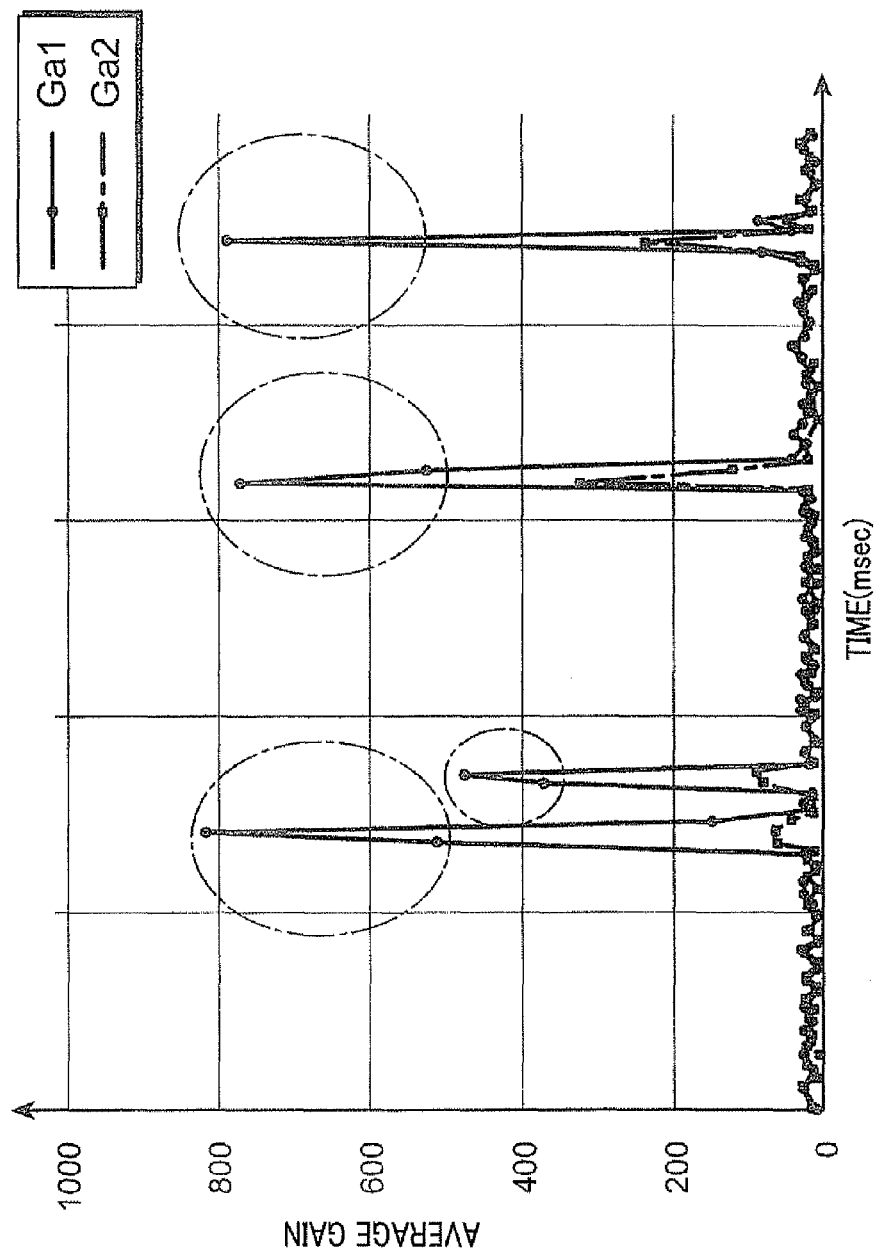

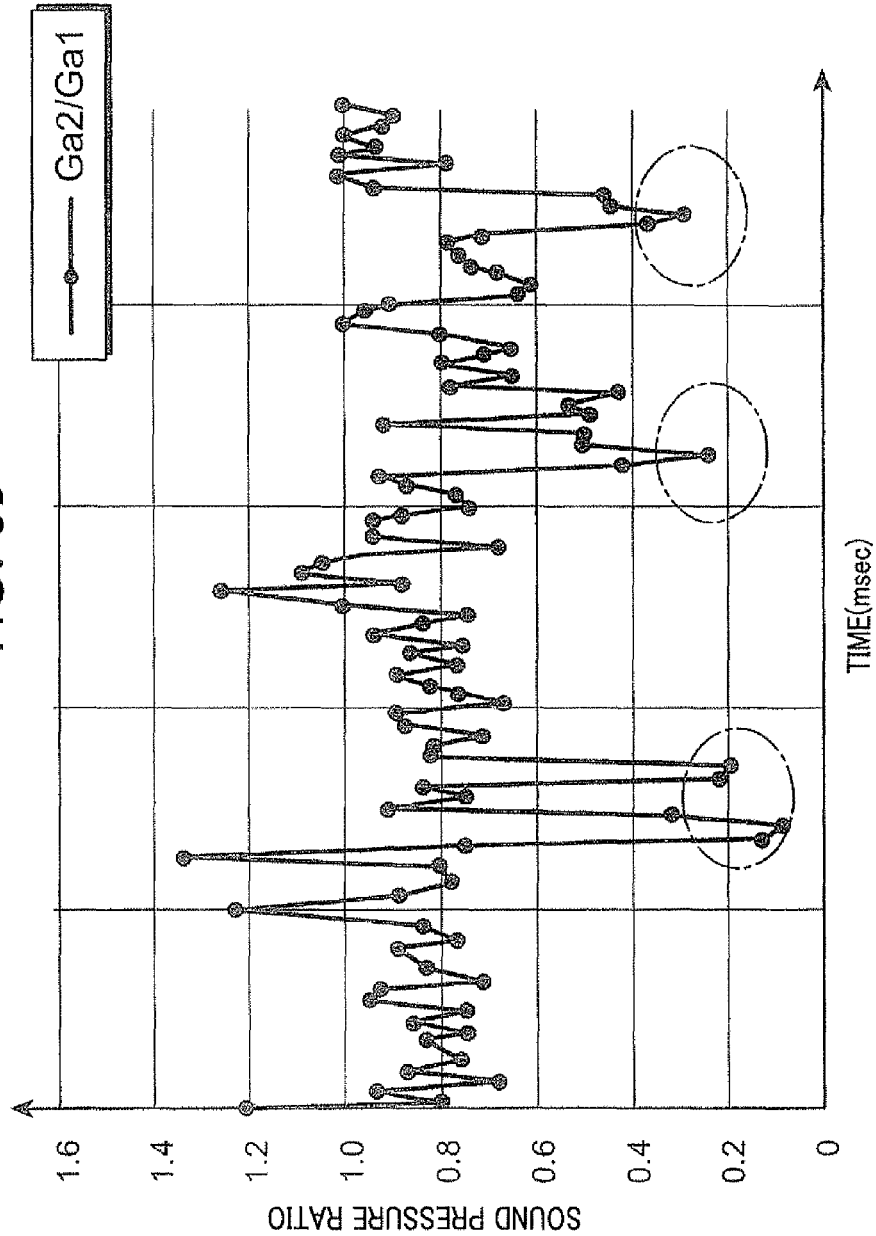

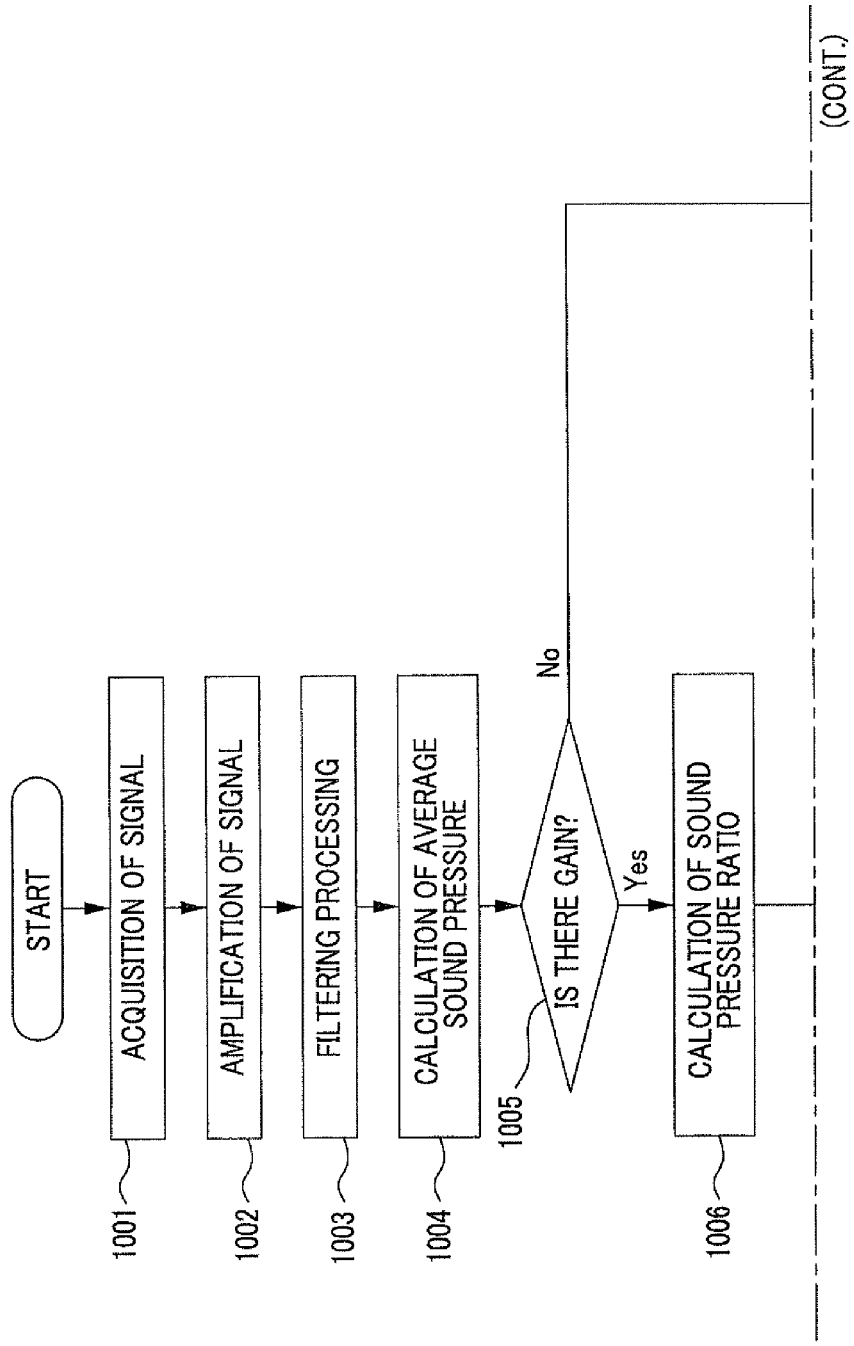

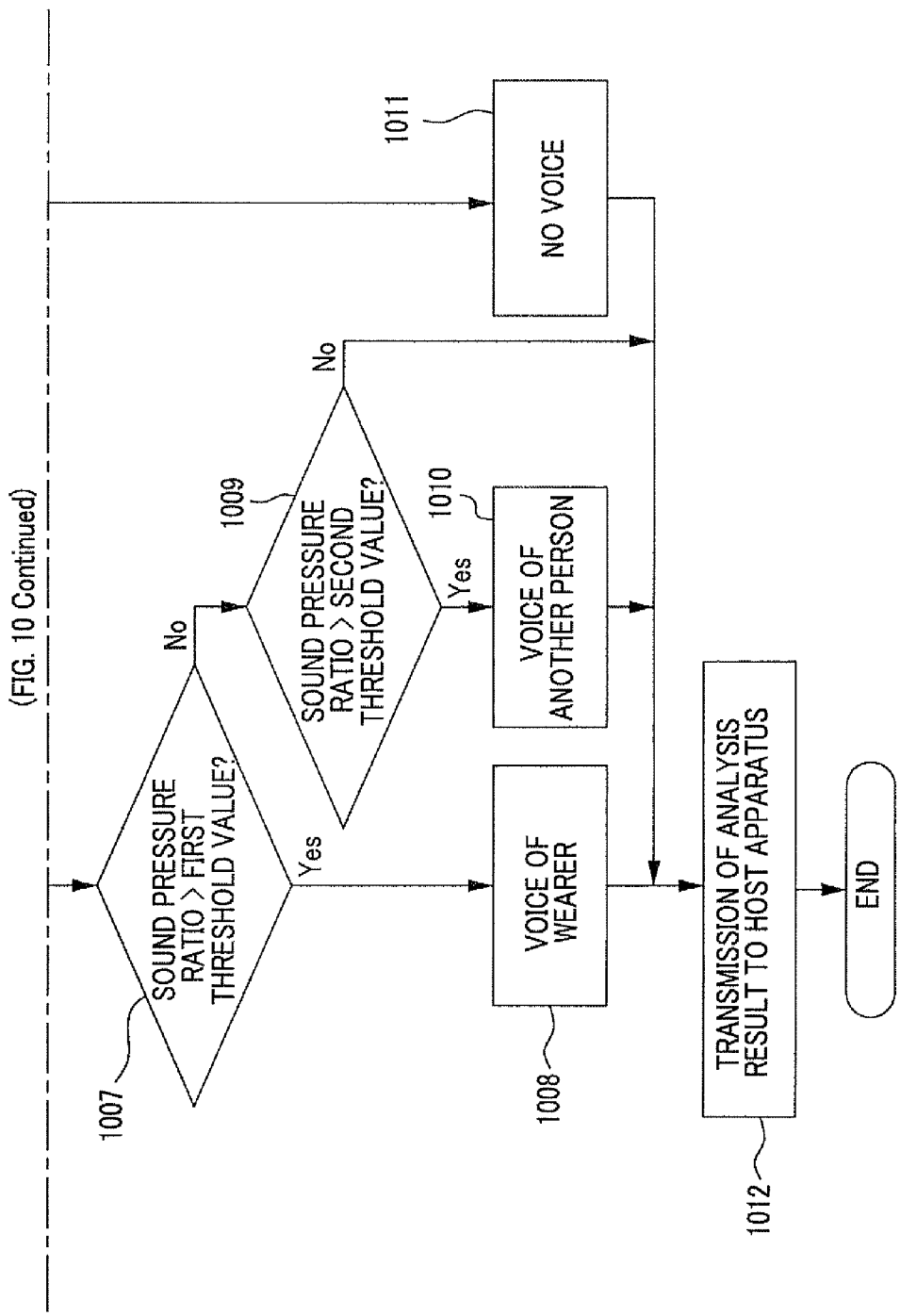

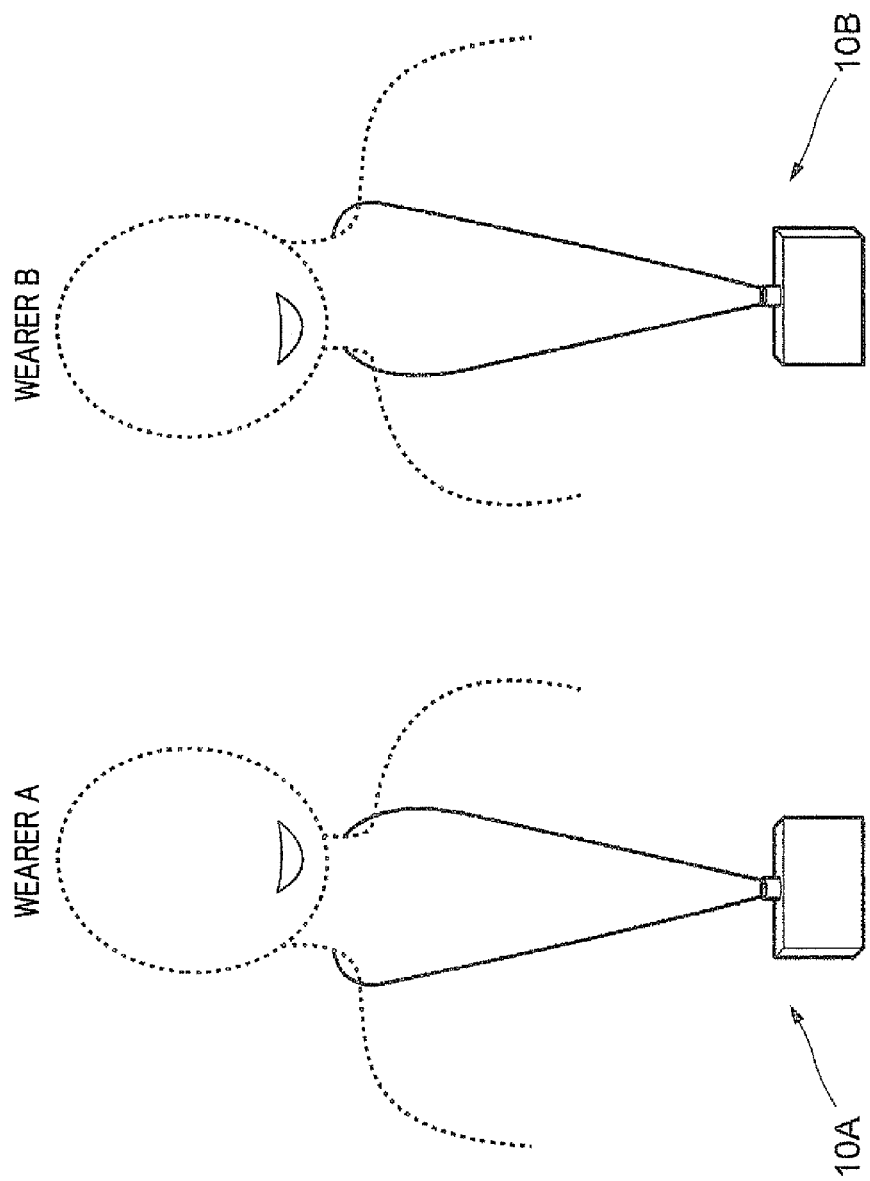

FIG. 13
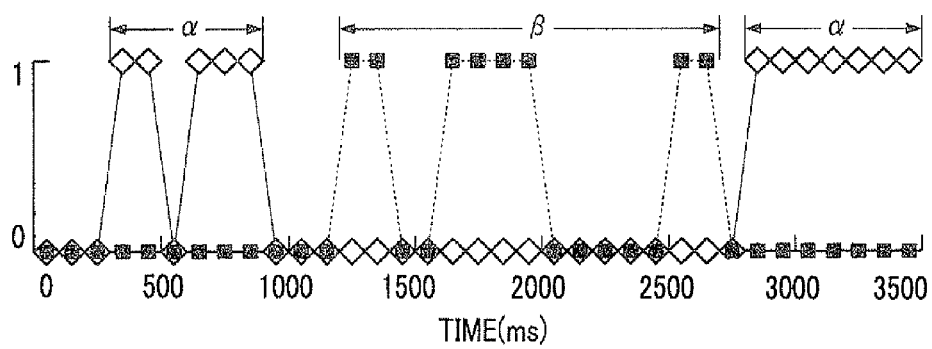
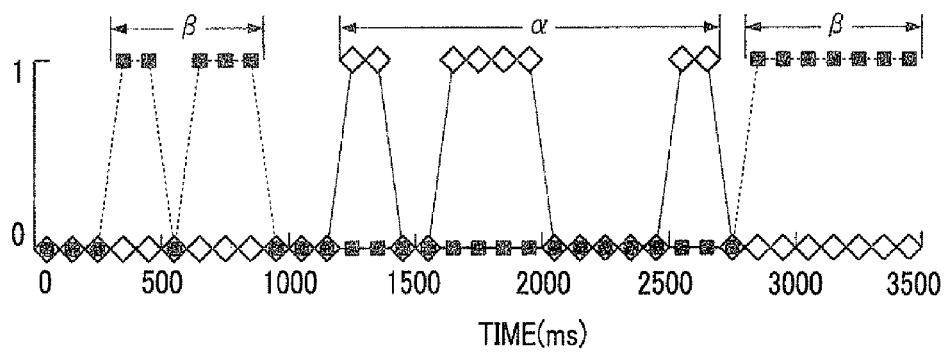
◇ VOICE OF WEARER
▪ VOICE OF ANOTHER PERSON
α SPEAKING SECTION OF WEARER
β SPEAKING SECTION OF ANOTHER PERSON

VOICE ANALYZER

CROSS-REFERENCE TO RELATED APPLICATIONS

This application is based on and claims priority under 35 USC 119 from Japanese Patent Application No. 2011-283452 filed Dec. 26, 2011.

BACKGROUND

Technical Field

The present invention relates to a voice analyzer.

SUMMARY

According to an aspect of the invention, there is provided a voice analyzer including: an apparatus body; a strap that is connected to the apparatus body and is used to hang the apparatus body from a neck of a user; a first voice acquisition unit that is provided in the strap or the apparatus body in order to acquire a voice; a second voice acquisition unit that is provided at a position where a distance of a sound wave propagation path from a mouth of the user is smaller than a distance of a sound wave propagation path from the mouth of the user to the first voice acquisition unit when the strap is hung on the neck of the user and that acquires a voice; and an identification unit that identifies a sound, in which first sound pressure that is sound pressure of a voice acquired by the first voice acquisition unit is larger by a predetermined value or more than second sound pressure that is sound pressure of a voice acquired by the second voice acquisition unit, on the basis of a result of comparison between the first sound pressure and the second sound pressure.

BRIEF DESCRIPTION OF THE DRAWINGS

Exemplary embodiments of the present invention will be described in detail based on the following figures, wherein:

FIGS. 6A and 6B are views showing the relationship between the sound pressure of the microphones and the collision sound;

FIG. 10 is a flow chart showing the operation of the terminal apparatus in the exemplary embodiment;

FIG. 12 is a view showing a situation where plural wearers who wear the terminal apparatus according to the exemplary embodiment have a conversation with each other;

FIG. 13 is a view showing an example of the speaking information of each terminal apparatus in the conversation situation shown in FIG. 12.

DETAILED DESCRIPTION

Hereinafter, an exemplary embodiment of the invention will be described in detail with reference to the accompanying drawings.

Example of the System Configuration

Figure 1:
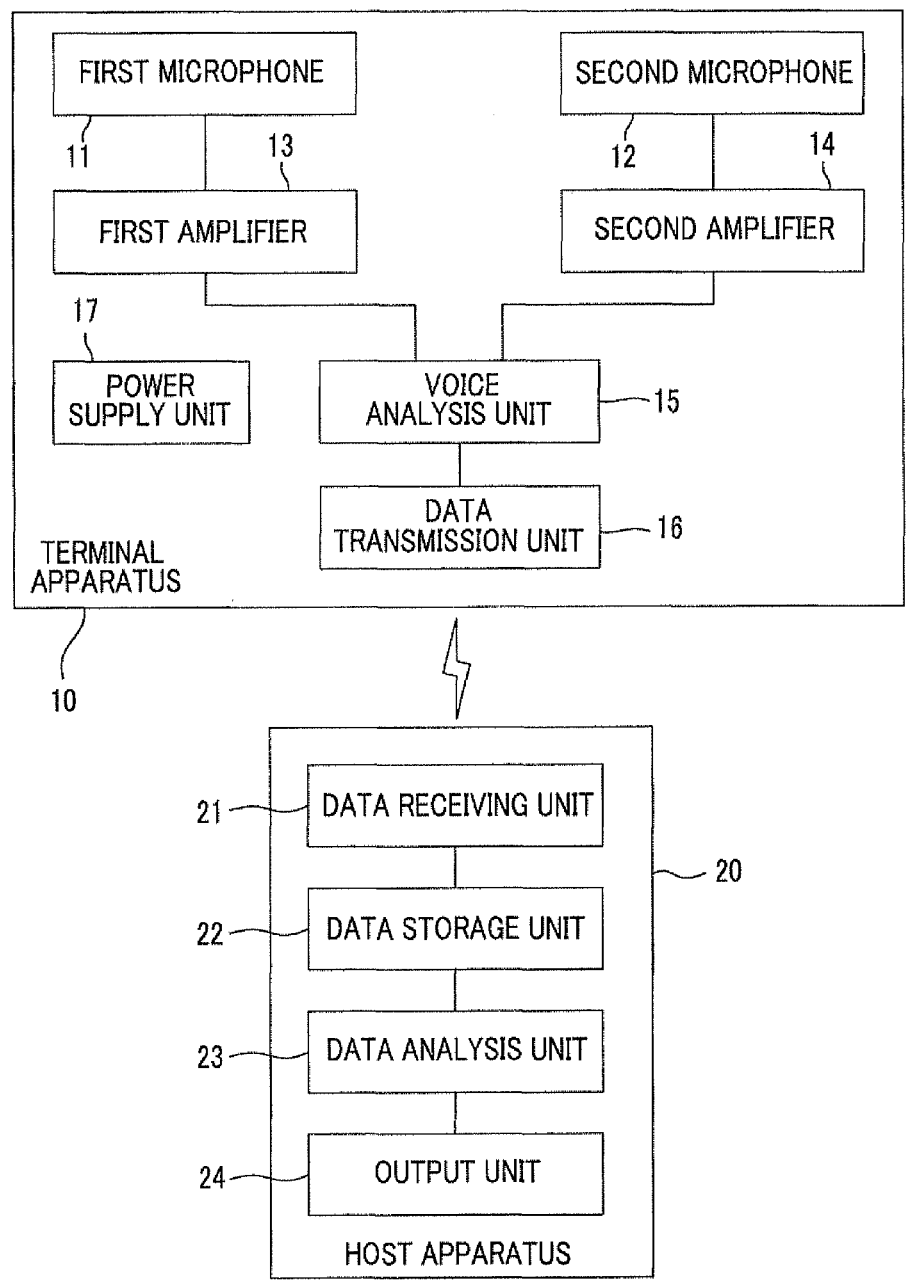
FIG. 1 is a view showing an example of the configuration of a voice analysis system according to an exemplary embodiment.

FIG. 1 is a view showing an example of the configuration of a voice analysis system according to the present exemplary embodiment.

As shown in FIG. 1, the system according to the present exemplary embodiment is configured to include a terminal apparatus 10 and a host apparatus 20. The terminal apparatus 10 and the host apparatus 20 are connected to each other through a wireless communication line. As types of the wireless communication line, lines based on the known methods, such as Wi-Fi (registered trademark) (Wireless Fidelity), Bluetooth (registered trademark), ZigBee (registered trademark), and UWB (Ultra Wideband), may be used. In addition, although only one terminal apparatus 10 is described in the example shown in FIG. 1, as many terminal apparatuses 10 as there are users are prepared in practice since the terminal apparatus 10 is used whilst worn by the user. This will be described in detail later. Hereinafter, the user who wears the terminal apparatus 10 is called a wearer.

The terminal apparatus 10 includes, as voice acquisition units, at least a pair of microphones (first and second microphones 11 and 12) and a pair of amplifiers (first and second amplifiers 13 and 14). In addition, the terminal apparatus 10 includes a voice analysis unit 15 that analyzes an acquired voice and a data transmission unit 16 that transmits an analysis result to the host apparatus 20, and further includes a power supply unit 17.

The first and second microphones 11 and 12 are disposed at different positions, at which distances of sound wave propagation paths from the mouth (speaking portion) of the wearer (hereinafter, simply referred to as "distances") are different. Here, it is assumed that the first microphone 11 is disposed at the position (for example, about 35 cm) far from the mouth (speaking portion) of the wearer and the second microphone 12 is disposed at the position (for example, about 10 cm) near the mouth (speaking portion) of the wearer. Various types of known microphones, such as a dynamic type microphone and a capacitor type microphone, may be used as the first and second microphones 11 and 12 in the present exemplary embodiment. In particular, it is preferable to use a non-directional MEMS (Micro Electro Mechanical Systems) type microphone.

The first and second amplifiers 13 and 14 amplify electric signals (voice signals) that the first and second microphones 11 and 12 output according to the acquired voice. Known operational amplifiers or the like may be used as the first and second amplifiers 13 and 14 in the present exemplary embodiment.

The voice analysis unit 15 analyzes the voice signals output from the first and second amplifiers 13 and 14. In addition, the voice analysis unit 15 determines whether the voice acquired by the first and second microphones 11 and 12 is a voice from the wearer, who wears the terminal apparatus 10, or voices from others. That is, the voice analysis unit 15 functions as an identification unit that identifies a speaker of the voice on the basis of voices acquired by the first and second microphones 11 and 12. Details of specific processing for identification of a speaker will be described later.

The data transmission unit 16 transmits the acquired data including the analysis result of the voice analysis unit 15 and the ID of the terminal apparatus 10 to the host apparatus through the wireless communication line. As the information transmitted to the host apparatus 20, for example, information regarding the voice acquisition time, sound pressure of the acquired voice, and the like of the first and second microphones 11 and 12 may be included in addition to the analysis result according to processing performed in the host apparatus 20. In addition, a data storage unit that stores the analysis result of the voice analysis unit 15 may be provided in the terminal apparatus 10, and data stored for a certain period of time may be collectively transmitted. The data may be transmitted through a cable line.

The power supply unit 17 supplies electric power to the first and second microphones 11 and 12, the first and second amplifiers 13 and 14, the voice analysis unit 15, and the data transmission unit 16. As a power supply, it is possible to use known power supplies, such as a dry battery and a rechargeable battery, for example. In addition, the power supply unit 17 includes known circuits, such as a voltage conversion circuit and a charging control circuit, when necessary.

The host apparatus 20 includes a data receiving unit 21 that receives the data transmitted from the terminal apparatus 10, a data storage unit 22 that stores the received data, a data analysis unit 23 that analyzes the stored data, and an output unit 24 that outputs an analysis result. The host apparatus 20 is realized by an information processing apparatus, such as a personal computer, for example. Moreover, in the present exemplary embodiment, the plural terminal apparatuses 10 are used as described above, and the host apparatus 20 receives the data from each of the plural terminal apparatuses 10.

The data receiving unit 21 corresponds to the wireless communication line described above, and receives the data from each terminal apparatus 10 and transmits it to the data storage unit 22. The data storage unit 22 is realized by a memory of a magnetic disk device of a personal computer, for example, and stores the received data acquired from the data receiving unit 21 for each speaker. Here, identification of a speaker is performed on the basis of a terminal ID transmitted from the terminal apparatus 10 and a collation of a speaker name and a terminal ID registered in the host apparatus 20 in advance. In addition, instead of the terminal ID, a wearer's name may be transmitted from the terminal apparatus 10.

The data analysis unit 23 is realized by a CPU program-controlled by a personal computer, for example, and analyzes the data stored in the data storage unit 22. As the specific analysis content and analysis method, various kinds of content and methods may be adopted depending on the purpose or aspect of use of the system according to the present exemplary embodiment. For example, the frequency of conversation between wearers of the terminal apparatus 10 or the tendencies of a conversation partner of each wearer is analyzed, or the relationship of speakers in a conversation is estimated from the information regarding the length or sound pressure of each voice in the conversation.

The output unit 24 outputs an analysis result of the data analysis unit 23 or performs output based on the analysis result. As the output unit, various kinds of units including display of a display device, printout using a printer, and voice output may be adopted according to the purpose or aspect of use of the system, the content or format of an analysis result, and the like.

Example of the Configuration of A Terminal Apparatus

Figure 2:
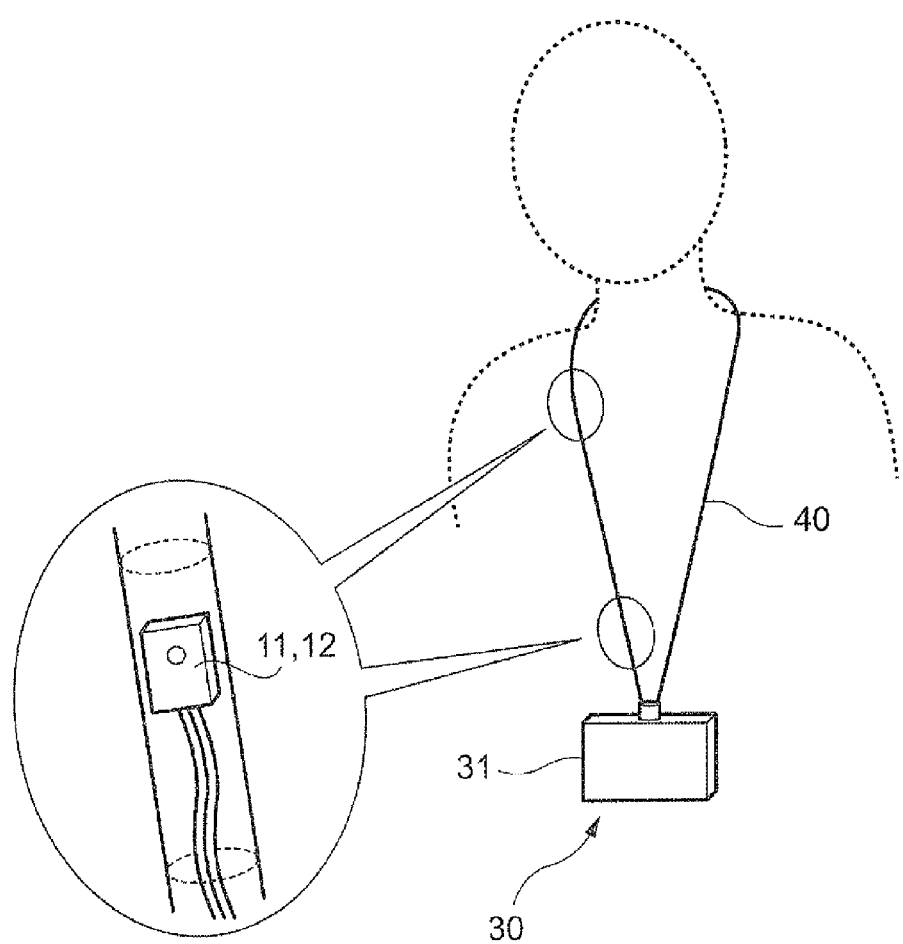
FIG. 2 is a view showing an example of the configuration of a terminal apparatus in the exemplary embodiment.

FIG. 2 is a view showing an example of the configuration of the terminal apparatus 10.

As described above, the terminal apparatus 10 is used in a state worn by each user. The terminal apparatus 10 in the present exemplary embodiment is configured to include an apparatus body 30 and a strap 40 connected to the apparatus body 30 so that the user can wear the terminal apparatus 10, as shown in FIG. 2. In the configuration shown in FIG. 2, the user wears the strap 40 on the neck so that the apparatus body 30 is hung from the neck.

The apparatus body 30 is configured such that at least circuits for realizing the first and second amplifiers 13 and 14, the voice analysis unit 15, the data transmission unit 16, and the power supply unit 17 and a power supply (battery) of the power supply unit 17 are housed in a rectangular parallelepiped thin case 31 formed of metal, resin, or the like. A pocket through which an ID card, on which ID information such as the name or team of the wearer is displayed, is inserted may be provided in the case 31. In addition, such ID information or the like may be printed on the surface of the case 31, or a seal on which the ID information or the like is described may be attached to the surface of the case 31.

The first and second microphones 11 and 12 are provided in the strap 40 (hereinafter, referred to as microphones 11 and 12 when the first and second microphones 11 and 12 are not distinguished from each other). The microphones 11 and 12 are connected to the first and second amplifiers 13 and 14 housed in the apparatus body 30 by cables (electric wires or the like) passing through the inside of the strap 40. As materials of the strap 40, it is possible to use known various materials, such as leather, synthetic leather, cotton, other natural fibers, synthetic fiber using resin, and metal. In addition, coating processing using silicon resin, fluorine resin, or the like may be performed.

The strap 40 has a cylindrical structure, and the microphones 11 and 12 are housed inside the strap 40. By providing the microphones 11 and 12 inside the strap 40, it is possible to prevent damage or contamination of the microphones 11 and 12, and it is suppressed that a participant in a dialogue is aware of the existence of the microphones 11 and 12. In addition, the first microphone 11 disposed at the position far from the mouth (speaking portion) of the wearer may be provided in the apparatus body 30 so as to be housed in the case 31. In the present exemplary embodiment, a case where the first microphone 11 is provided in the strap 40 will be described as an example.

Referring to FIG. 2, the first microphone 11 which is an example of the first voice acquisition unit is provided at the end (for example, a position within 10 cm from the center of the apparatus body 30) of the strap 40 connected to the apparatus body 30. Accordingly, the first microphone 11 is disposed at the position distant from the mouth (speaking portion) of the wearer by about 30 cm to 40 cm in a state where the wearer wears the strap 40 on the neck so that the apparatus body 30 is hung from the neck. In addition, also when the first microphone 11 is provided in the apparatus body 30, the distance from the mouth (speaking portion) of the wearer to the first microphone 11 is almost the same as above.

The second microphone 12 which is an example of the second voice acquisition unit is provided at the position (for example, a position of about 25 cm to 35 cm from the center of the apparatus body 30) distant from the end of the strap 40 connected to the apparatus body 30. Accordingly, in a state where the wearer wears the strap 40 on the neck so that the apparatus body 30 is hung from the neck, the second microphone 12 is located on the neck (for example, a position equivalent to the collarbone) of the wearer and is disposed at the position distant from the mouth (speaking portion) of the wearer by about 10 cm to 20 cm.

In addition, the terminal apparatus 10 in the present exemplary embodiment is not limited to the configuration shown in FIG. 2. For example, the positional relationship between the first and second microphones 11 and 12 may be specified such that the distance (of the sound wave propagation path) from the first microphone 11 to the mouth (speaking portion) of the wearer becomes about several times the distance (of the sound wave propagation path) from the second microphone 12 to the mouth (speaking portion) of the wearer. In addition, the microphones 11 and 12 are not limited to being provided in the strap 40 as described above, and the wearer may wear the microphones 11 and 12 using various methods. For example, each of the first and second microphones 11 and 12 may be separately fixed to clothes using a pin or the like. In addition, it is also possible to prepare a dedicated mounting fixture designed so that each of the first and second microphones 11 and 12 is fixed at a desired position.

In addition, the configuration of the apparatus body 30 is not limited to the configuration shown in FIG. 2 in which the apparatus body 30 is connected to the strap 40 so as to be hung from the neck of the wearer, and the apparatus body 30 may be formed as a device which may be easily carried. For example, the apparatus body 30 may be mounted on clothes or the body using a clip or a belt instead of the strap in the present exemplary embodiment, or the apparatus body 30 may be simply carried in a pocket or the like. In addition, mobile phones or known portable electronic information terminals may be configured to realize a function of receiving voice signals from the microphones 11 and 12 and amplifying and analyzing the voice signals. Here, when the first microphone 11 is provided in the apparatus body 30, it is necessary to hold the positional relationship between the first and second microphones 11 and 12 as described above. Accordingly, the position of the apparatus body 30 at the time of carrying is specified.

In addition, the microphones 11 and 12 and the apparatus body 30 (or the voice analysis unit 15) may be wirelessly connected to each other instead of being connected using a cable. Although the first and second amplifiers 13 and 14, the voice analysis unit 15, the data transmission unit 16, and the power supply unit 17 are housed in the single case 31 in the above example of the configuration, they may be grouped into plural parts. For example, the power supply unit 17 may be connected to an external power supply without being housed in the case 31.

Identification of a Speaker (Wearer and Others) Based on Non-Linguistic Information of Acquired Voice Next, a method of identifying a speaker in the present exemplary embodiment will be described.

The system according to the present exemplary embodiment identifies a voice of the wearer of the terminal apparatus 10 or voices of others using the voice information acquired by the two microphones 11 and 12 provided in the terminal apparatus 10. In other words, in the present exemplary embodiment, it is determined whether the speaker of the acquired voice is a wearer or others. In addition, in the present exemplary embodiment, speaker identification is performed on the basis of the non-linguistic information, such as sound pressure (volume input to the microphones 11 and 12) instead of the linguistic information acquired using morphological analysis or dictionary information of the information regarding the acquired voice. That is, a speaker of the voice is identified from the speaking situation specified by the non-linguistic information instead of the content of speaking specified by the linguistic information.

As described with reference to FIGS. 1 and 2, in the present exemplary embodiment, the first microphone 11 of the terminal apparatus 10 is disposed at the position far from the mouth (speaking portion) of the wearer and the second microphone 12 is disposed at the position near the mouth (speaking portion) of the wearer. That is, assuming that the mouth (speaking portion) of the wearer is a sound source, the distance between the first microphone 11 and the sound source is greatly different from the distance between the second microphone 12 and the sound source. Specifically, the distance between the first microphone 11 and the sound source is about 1.5 to 4 times the distance between the second microphone 12 and the sound source. Here, sound pressure of the acquired voice in each of the microphones 11 and 12 decreases (distance-decreases) as the distance between each of the microphones 11 and 12 and the sound source increases. Therefore, for the voice of the wearer, the sound pressure of the acquired voice in the first microphone 11 is greatly different from the sound pressure of the acquired voice in the second microphone 12.

On the other hand, assuming that the mouth (speaking portion) of a person other than the wearer (another person) is a sound source, the distance between the first microphone 11 and the sound source and the distance between the second microphone 12 and the sound source do not change greatly since another person is separated from the wearer. Although there may be a difference between both the distances depending on the position of another person with respect to the wearer, the distance between the first microphone 11 and the sound source is not several times the distance between the second microphone 12 and the sound source except for the case when the mouth (speaking portion) of the wearer is a sound source. Therefore, for the voice of another person, the sound pressure of the acquired voice in the first microphone 11 is not largely different from the sound pressure of the acquired voice in the second microphone 12 as in the case of the voice of the wearer.

Figure 3:
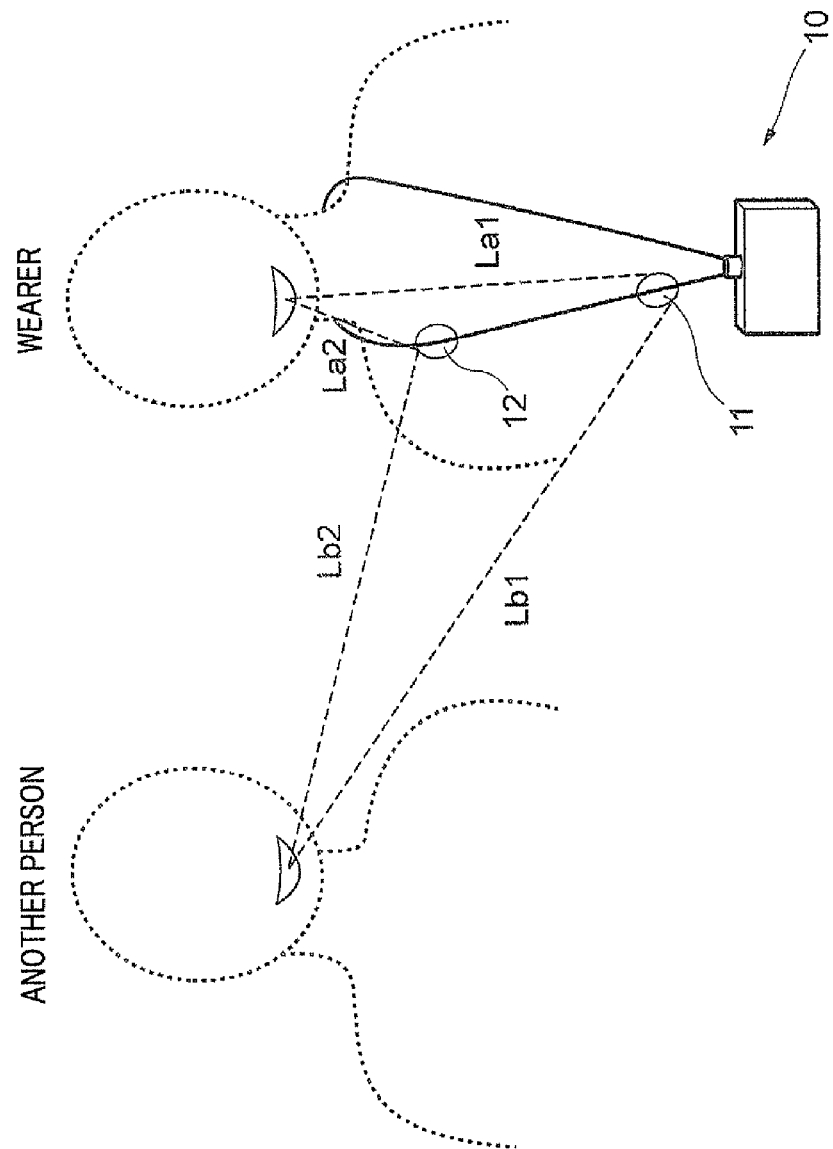
FIG. 3 is a view showing the positional relationship between mouths (speaking portions) of a wearer and another person and a microphone.

FIG. 3 is a view showing the positional relationship between mouths (speaking portions) of a wearer and another person and the microphones 11 and 12.

In the relationship shown in FIG. 3, the distance between a sound source a, which is a mouth (speaking portion) of the wearer, and the first microphone 11 is set to La1 and the distance between the sound source a and the second microphone 12 is set to La2. In addition, the distance between a sound source b, which is a mouth (speaking portion) of another person, and the first microphone 11 is set to Lb1 and the distance between the sound source b and the second microphone 12 is set to Lb2. In this case, the following relationship is satisfied.

$$La1 > La2 (La1 \cong 1.5 \times La2 \sim 4 \times La2)$$

$$Lb1 \cong Lb2$$

Figure 4:
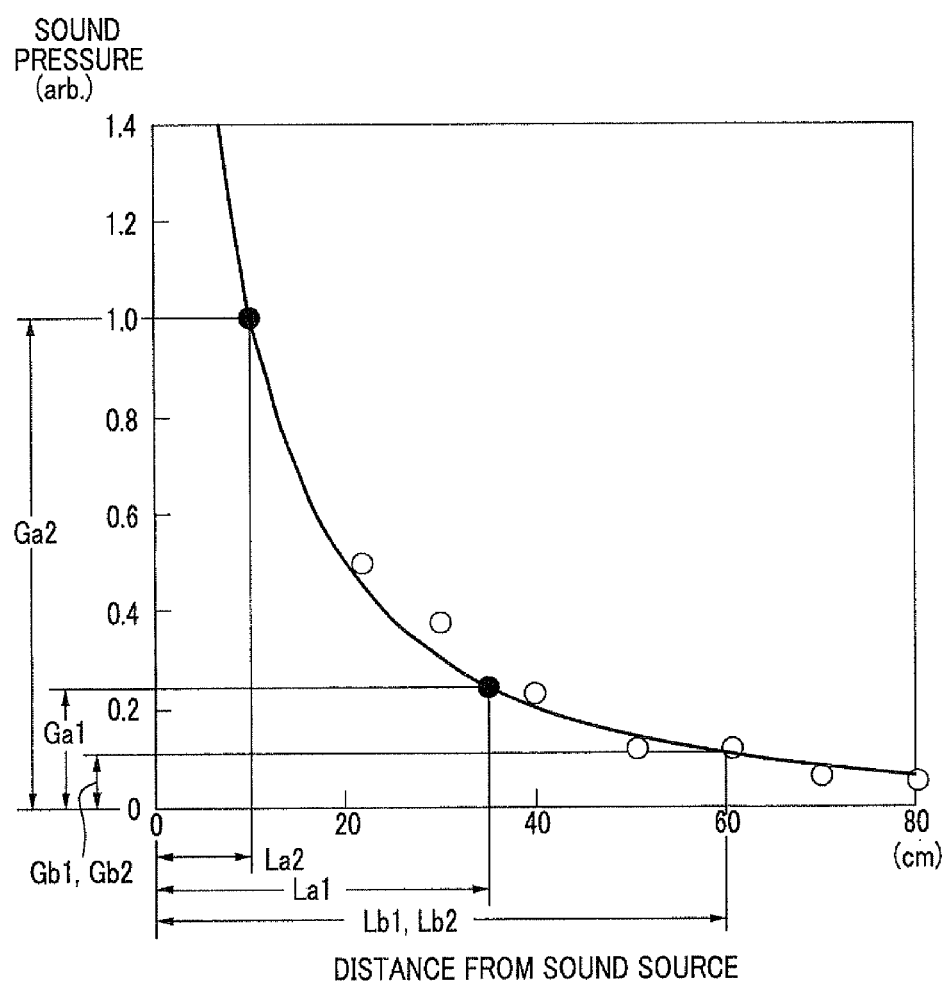
FIG. 4 is a view showing the relationship of the distance of a sound wave propagation path between a microphone and a sound source and sound pressure (input volume)

FIG. 4 is a view showing the relationship of the distance between each of the microphones 11 and 12 and the sound source and the sound pressure (input volume).

As described above, the sound pressure distance-decreases with the distance between each of the microphones 11 and 12 and the sound source. In FIG. 4, when sound pressure (first sound pressure) Ga1 in the case of the distance La1 is compared with sound pressure (second sound pressure) Ga2 in the case of the distance La2, the sound pressure Ga2 is about 4 times the sound pressure Ga1. On the other hand, since the distances Lb1 and Lb2 are approximately equal, sound pressure Gb1 in the case of the distance Lb1 and sound pressure Gb2 in the case of the distance Lb2 are almost equal. In the present exemplary embodiment, therefore, a voice of the wearer and voices of others in the acquired voices are identified using the difference of the sound pressure ratio. In addition, although the distances Lb1 and Lb2 are set to 60 cm in the example shown in FIG. 4, it is meaningful that the sound pressure Gb1 and the sound pressure Gb2 are almost equal, and the distances Lb1 and Lb2 are not limited to the values shown in FIG. 4.

Figure 5:
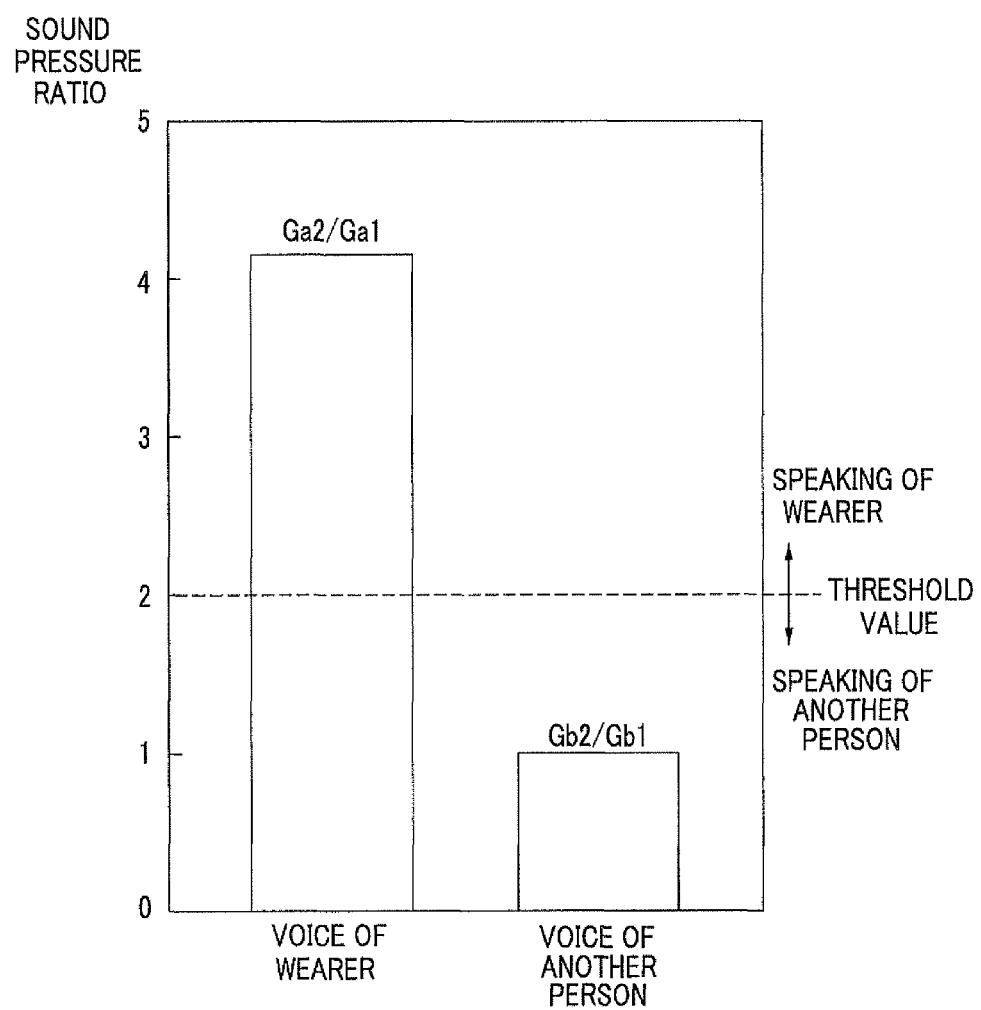
FIG. 5 is a view showing a method of identifying a voice of a wearer and a voice of another person.

FIG. 5 is a view showing a method of identifying a voice of a wearer and a voice of another person.

As described with reference to FIG. 4, for the voice of the wearer, the sound pressure Ga2 of the second microphone 12 is several times (for example, about 4 times) the sound pressure Ga1 of the first microphone 11. In addition, for the voice of another person, the sound pressure Gb2 of the second microphone 12 is almost equal to (about 1 times) the sound pressure Gb1 of the first microphone 11. In the present exemplary embodiment, therefore, a threshold value (first threshold value) of the ratio between the sound pressure of the second microphone 12 and the sound pressure of the first microphone 11 is set. The first threshold value is set to a value between the value of the sound pressure ratio in the voice of the wearer and the value of the sound pressure ratio in the voice of another person. In addition, a voice with a larger sound pressure ratio than the first threshold value is determined to be the voice of the wearer, and a voice with a smaller sound pressure ratio than the first threshold value is determined to be the voice of another person. In the example shown in FIG. 5, the first threshold value is set to 2. Since the sound pressure ratio Ga2/Ga1 exceeds the first threshold value 2, the voice is determined to be the voice of the wearer. In addition, since the sound pressure ratio Gb2/Gb1 is smaller than the first threshold value 2, the voice is determined to be the voice of another person.

Identification of the Acquired Voice Including the Collision Sound

As described above, the user of the terminal apparatus 10 wears the strap 40 on the neck so that the apparatus body 30 is hung from the neck. In addition, for example, when a user moves in a state where the user wears the terminal apparatus 10 on the neck, the terminal apparatus 10 shakes and accordingly, the apparatus body 30 of the terminal apparatus 10 may collide with other members. Thus, when the apparatus body 30 collides with other members, collision sound is generated. For example, when the apparatus body 30 is hit by a part of the body of the user of the terminal apparatus 10, a desk, or an ID card or a mobile phone hung on the neck of the user excluding the terminal apparatus 10, collision sound is generated. In addition, this collision sound and the voice of the wearer or the voices of others are acquired as acquired voices by the microphones 11 and 12.

When the microphones 11 and 12 acquire the collision sound generated when the apparatus body 30 collides with other members, the voice of the wearer in the acquired voices may be recognized as the voices of others.

Hereinafter, the relationship between the acquisition of collision sound and the recognition of speaking of the wearer as speaking of others will be described.

FIGS. 6A and 6B are views showing the relationship between the sound pressure of the microphones 11 and 12 and the collision sound. Specifically, FIG. 6A is a view showing changes in the sound pressure of the microphones 11 and 12 which acquire the voices including the collision sound, and FIG. 6B is a view showing a change in the sound pressure ratio of the microphones 11 and 12 shown in FIG. 6A.

In the terminal apparatus 10 of the present exemplary embodiment, the size of the collision sound acquired by the first microphone 11 is larger than the size of the collision sound acquired by the second microphone 12. More specifically, the collision sound acquired by the first microphone 11 is generated for a short time (for example, about 0.3 ms) compared with the voice.

For example, in FIG. 6A, if the relation between the average sound pressure (average gain) Ga1 of the first microphone 11 and the average sound pressure (average gain) Ga2 of the second microphone 12 when the terminal apparatus 10 collides with other members (inside one-dot chain line) is compared, the sound pressure Ga1 is larger than the sound pressure Ga2. This is because the first microphone 11 is closer to the apparatus body 30, which causes the collision sound, than the second microphone 12 is.

Moreover, in FIG. 6B, the sound pressure ratio between the average sound pressure Ga1 of the first microphone 11 and the average sound pressure Ga2 of the second microphone 12 when the terminal apparatus 10 collides with other members (inside one-dot chain lines) is smaller than that when the terminal apparatus 10 does not collide with other members (outside one-dot chain lines).

Now, a case where the collision sound acquired by the first microphone 11 becomes larger than the collision sound acquired by the second microphone 12 will be described in more detail.

Figure 7:
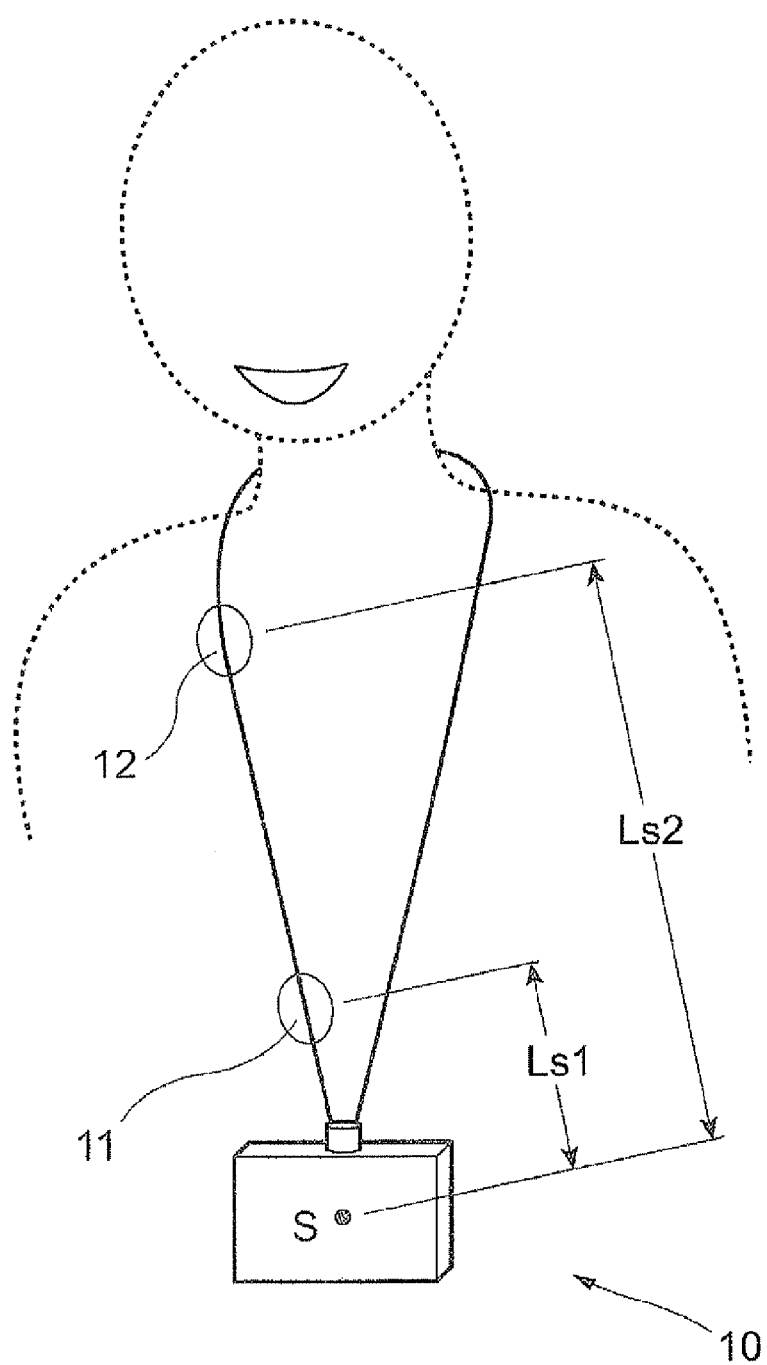
FIG. 7 is a view showing the positional relationship between the apparatus body and microphones.

FIG. 7 is a view showing the positional relationship between the apparatus body 30 and the microphones 11 and 12.

In the relationship shown in FIG. 7, the distance between a sound source S, which is the center of the apparatus body 30, and the first microphone 11 is set to Ls1 and the distance between the sound source S and the second microphone 12 is set to Ls2. Moreover, as described above the first microphone 11 is provided at the position within 10 cm from the center of the apparatus body 30, and the second microphone 12 is provided at the position within about 25 cm to 35 cm from the center of the apparatus body 30. In this case, the following relationship is satisfied.

$$Ls1 < Ls2 (2.5 \times Ls1 \sim 3.5 \times Ls1 \cong Ls2)$$

In addition, when the first microphone 11 is provided in the apparatus body 30, the distance Ls1 is further reduced.

Figure 8:
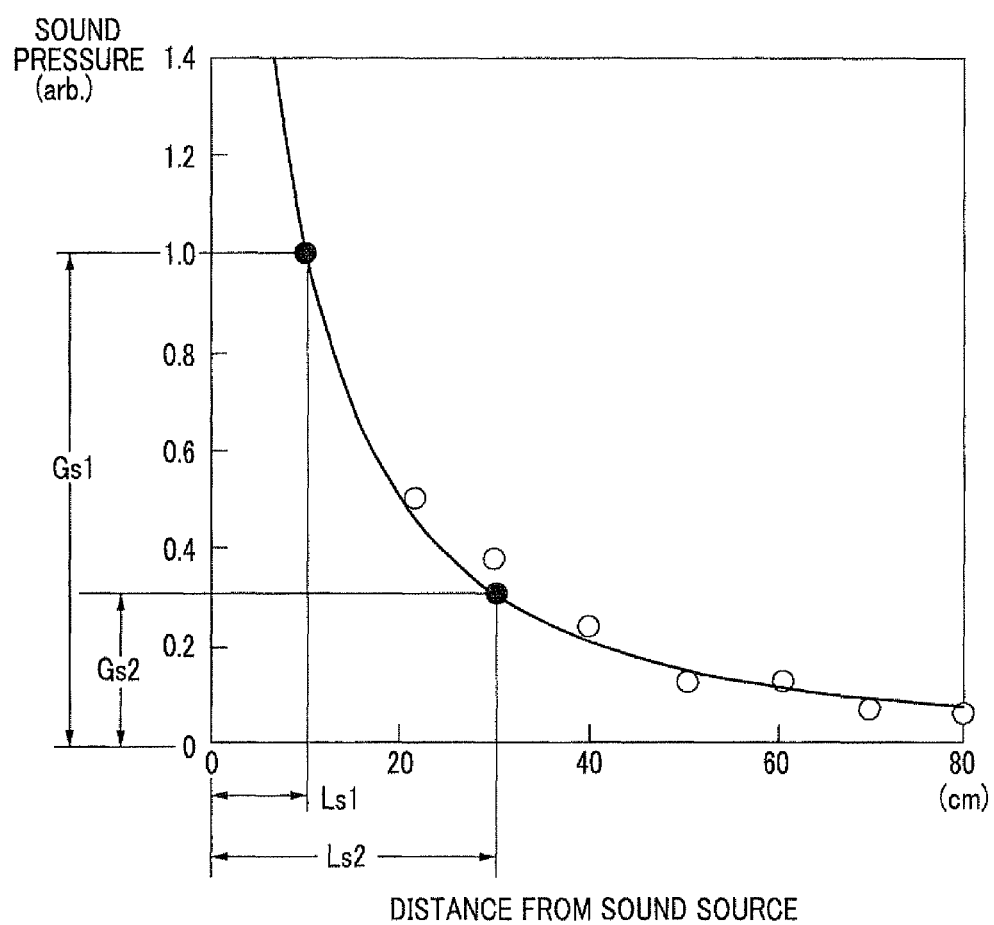
FIG. 8 is a view showing the relationship of the distance of a sound wave propagation path between a microphone and a sound source and sound pressure (input volume)

FIG. 8 is a view showing the relationship of the distance of the sound wave propagation path between each of the microphones 11 and 12 and the sound source and the sound pressure (input volume).

As described above, the sound pressure distance-decreases with the distance between each of the microphones 11 and 12 and the sound source. In FIG. 8, when sound pressure Gs1 in the case of the distance Ls1 is compared with sound pressure Gs2 in the case of the distance Ls2, the sound pressure Gs2 is about 0.3 times the sound pressure Gs1. In addition, when the first microphone 11 is provided in the apparatus body 30, the distance Ls1 is further reduced. Accordingly, the sound pressure Gs1 is further increased. In this case, therefore, the sound pressure Gs2 is much smaller than 0.3 times the sound pressure Gs1.

Figure 9:
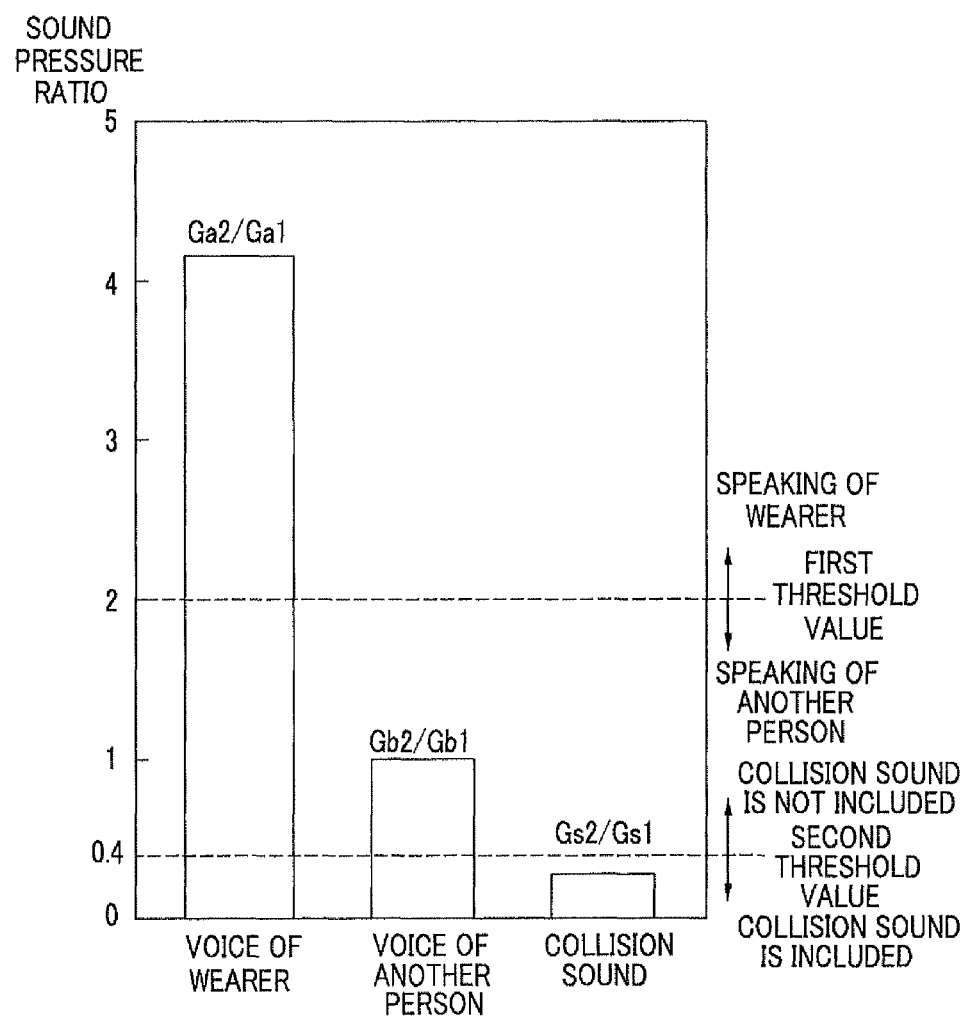
FIG. 9 is a view showing the relationship between a speaker identification method and an identification method when the acquired voice includes the collision sound.

FIG. 9 is a view showing the relationship between a speaker identification method and an identification method when the acquired voice includes the collision sound.

As shown in FIG. 9, in the present exemplary embodiment, determination as a voice of a wearer is made when the sound pressure ratio is larger than the first threshold value (that is, when the sound pressure Ga2 of the second microphone 12 is larger than twice the sound pressure Ga1 of the first microphone 11). However, even in a section where the wearer speaks, the sound pressure ratio becomes smaller than the first threshold value if the sound pressure Ga1 of the first microphone 11 increases due to the influence of the collision sound. As a result, this section may be determined as a section in which others speak.

In addition, since there are gestures in many cases when the wearer speaks, collision sound caused by the apparatus body 30 is generated more easily. In this case, accordingly, the frequency, in which a section in which the wearer speaks is determined as a section in which others speak, increases.

In the present exemplary embodiment, therefore, it is determined whether or not the acquired voice includes collision sound by adopting the following configuration, so that the influence of the collision sound on distinction between the voice of the wearer and the voices of others is suppressed. Specifically, in the present exemplary embodiment, a threshold value (second threshold value) of the ratio between the sound pressure of the second microphone 12 and the sound pressure of the first microphone 11 is set.

This uses the fact that the ratio between the sound pressure of the second microphone 12 and the sound pressure of the first microphone 11 tends to be different between the acquired voice including the collision sound and the acquired voice not including the collision sound.

More specifically, as described with reference to FIG. 8, for the acquired voice when the collision sound is generated, the sound pressure Gs2 of the second microphone 12 may be a fraction (for example, about 0.3 times) of the sound pressure Gs1 of the first microphone 11. On the other hand, as described above, the sound pressure Ga2 of the second microphone 12 is several times (for example, about 4 times) the sound pressure Ga1 of the first microphone 11 for the voice of the wearer, and the sound pressure Gb2 of the second microphone 12 is almost equal to (for example, about 1 time) the sound pressure Gb1 of the first microphone 11 for the voices of others.

Therefore, an appropriate value between the sound pressure ratio in the voices of others and the sound pressure ratio in the acquired voice when the collision sound is generated is set as a second threshold value. In addition, the voice with a sound pressure ratio smaller than the second threshold value is determined as the acquired voice including the collision sound, and the voice with a sound pressure ratio larger than the second threshold value is determined as the acquired voice not including the collision sound. In addition, in the present exemplary embodiment, when determination as the acquired voice including the collision sound is made, distinction between the voice of the wearer and the voices of others is not performed.

In the example shown in FIG. 9, the second threshold value is set to 0.4. Since the sound pressure ratios Ga2/Ga1 and Gb2/Gb1 are larger than the second threshold value 0.4, determination as the voice not including the collision sound is made. In addition, since the sound pressure ratio Gs2/Gs1 is smaller than the second threshold value 0.4, determination as the voice including the collision sound is made.

In addition, the first and second threshold values are just examples, and may be changed according to the environment where the system of the present exemplary embodiment is used.

Incidentally, not only the voice and the collision sound but also the sound (environmental sound) of an environment in which the terminal apparatus 10 is used, such as operating sound of the air conditioning and footsteps associated with walking of the wearer, is included in the voices acquired by the microphones 11 and 12. The relationship of the distance between the sound source of this environmental sound and each of the microphones 11 and 12 is similar to that in the case of voices of others. That is, according to the example shown in FIGS. 4 and 5, assuming that the distance between a sound source c of noise and the first microphone 11 is set to Lc1 and the distance between the sound source c of noise and the second microphone 12 is set to Lc2, the distances Lc1 and Lc2 are approximately equal. In addition, the sound pressure ratio Gc2/Gc1 in acquired voices of the microphones 11 and 12 is smaller than the first threshold value 2. However, such an environmental sound is separated and removed from the voice by performing filtering processing based on the known technique using a band pass filter, a gain filter, or the like.

Example of an Operation of a Terminal Apparatus

FIG. 10 is a flow chart showing the operation of the terminal apparatus 10 in the present exemplary embodiment.

As shown in FIG. 10, when the microphones 11 and 12 of the terminal apparatus 10 acquire voices, electric signals (voice signals) corresponding to the acquired voices are transmitted from the microphones 11 and 12 to the first and second amplifiers 13 and 14, respectively (step 1001). When the voice signals from the microphones 11 and 12 are acquired, the first and second amplifiers 13 and 14 amplify the signals and transmit the amplified signals to the voice analysis unit 15 (step 1002).

The voice analysis unit 15 performs filtering processing on the signal amplified by each of the first and second amplifiers 13 and 14 to remove environmental sound components from the signal (step 1003). Then, the voice analysis unit 15 calculates the average sound pressure in the voice acquired by each of the microphones 11 and 12 for the signal, from which noise components are removed, every fixed time unit (for example, few tenths of a second to few hundredths of a second) (step 1004).

When there is a gain of the average sound pressure, which is calculated in step 1004, in each of the microphones 11 and 12 (Yes in step 1005), the voice analysis unit 15 determines that there is a voice (speaking has been done). Then, the voice analysis unit 15 calculates the ratio (sound pressure ratio) between the average sound pressure in the first microphone 11 and the average sound pressure in the second microphone 12 (step 1006).

Then, when the sound pressure ratio calculated in step 1006 is larger than the first threshold value (Yes in step 1007), the voice analysis unit 15 determines that the voice is from the wearer (step 1008). In addition, when the sound pressure ratio calculated in step 1006 is smaller than the first threshold value (No in step 1007) and the sound pressure ratio calculated in step 1006 is larger than the second threshold value (Yes in step 1009), the voice analysis unit 15 determines that the voices are voices from others (step 1010). In addition, when the sound pressure ratio calculated in step 1006 is smaller than the first threshold value (No in step 1007) and the sound pressure ratio calculated in step 1006 is smaller than the second threshold value (No in step 1009), the voice analysis unit 15 determines that the acquired sound includes a collision sound. That is, the voice analysis unit 15 recognizes the acquired sound including the collision sound as noise. In addition, in the present exemplary embodiment, when determination as the acquired sound including the collision sound is made, the voice analysis unit 15 does not perform distinction between the voice of the wearer and the voices of others as described above.

In addition, when there is no gain of the average sound pressure in each of the microphones 11 and 12 calculated in step 1004 (No in step 1005), the voice analysis unit 15 determines that there is no voice (speaking has not been performed) (step 1011).

Then, the voice analysis unit (identification unit) 15 transmits the information (information regarding whether or not there is a voice and information regarding a speaker) obtained by the processing in steps 1004 to 1011, as an analysis result, to the host apparatus 20 through the data transmission unit 16 (step 1012). The length of speaking time of each speaker (wearer or another person), the value of the gain of average sound pressure, and other additional information items may be transmitted to the host apparatus 20 together with the analysis result. In this case, when No is determined in step 1009, that is, when it is determined that the acquired voice includes collision sound, the voice analysis unit 15 transmits the analysis result without identifying the speaker.

In addition, in the present exemplary embodiment, determination regarding whether the voice is a voice from the wearer or a voice from another person is performed by comparing the sound pressure of the first microphone 11 with the sound pressure of the second microphone 12. In the present exemplary embodiment, any kind of speaker identification may be performed if it is performed on the basis of the non-linguistic information extracted from the voice signals themselves acquired by the microphones 11 and 12, without being limited to the comparison of sound pressure.

For example, it is also possible to compare the voice acquisition time (output time of a voice signal) in the first microphone 11 with the voice acquisition time in the second microphone 12.

In this case, since there is a large difference between the distance from the mouth (speaking portion) of the wearer to the first microphone 11 and the distance from the mouth (speaking portion) of the wearer to the second microphone 12, a difference of the voice acquisition time occurs to some extent for the voice of the wearer. On the other hand, since there is a small difference between the distance from the mouth (speaking portion) of the wearer to the first microphone 11 and the distance from the mouth (speaking portion) of the wearer to the second microphone 12, an even smaller difference of voice acquisition time occurs for the voice of another person than the case of the voice of the wearer. Therefore, it is possible to set a first threshold value of the time difference of voice acquisition time and to determine that the voice is from the wearer when the time difference of voice acquisition time is larger than the first threshold value and determine that the voice is from another person when the time difference of voice acquisition time is smaller than the first threshold value.

Moreover, when the voice acquisition time in the first microphone 11 is compared with the voice acquisition time in the second microphone 12, there is a certain amount of difference (time difference) in the voice acquisition time of the acquired voice including the collision sound because the difference between the distance from the apparatus body 30 that generates the collision sound to the first microphone 11 and the distance from the apparatus body 30 that generates the collision sound to the second microphone 12 is large. More specifically, the voice acquisition time of the first microphone 11 is earlier than the voice acquisition time of the second microphone 12. On the other hand, in the case of the voice of the wearer or the voices of others not including the collision sound, the voice acquisition time of the first microphone 11 is later than the voice acquisition time of the second microphone 12, or the voice acquisition time of the first microphone 11 is almost the same as the voice acquisition time of the second microphone 12. Therefore, it is possible to set a second threshold value of the time difference of voice acquisition time and to determine that the voice with the time difference of voice acquisition time, which is smaller than the second threshold value, is the acquired voice including the collision sound and the voice with the time difference of voice acquisition time, which is larger than the second threshold value, is the acquired voice not including the collision sound.

Figure 11A:
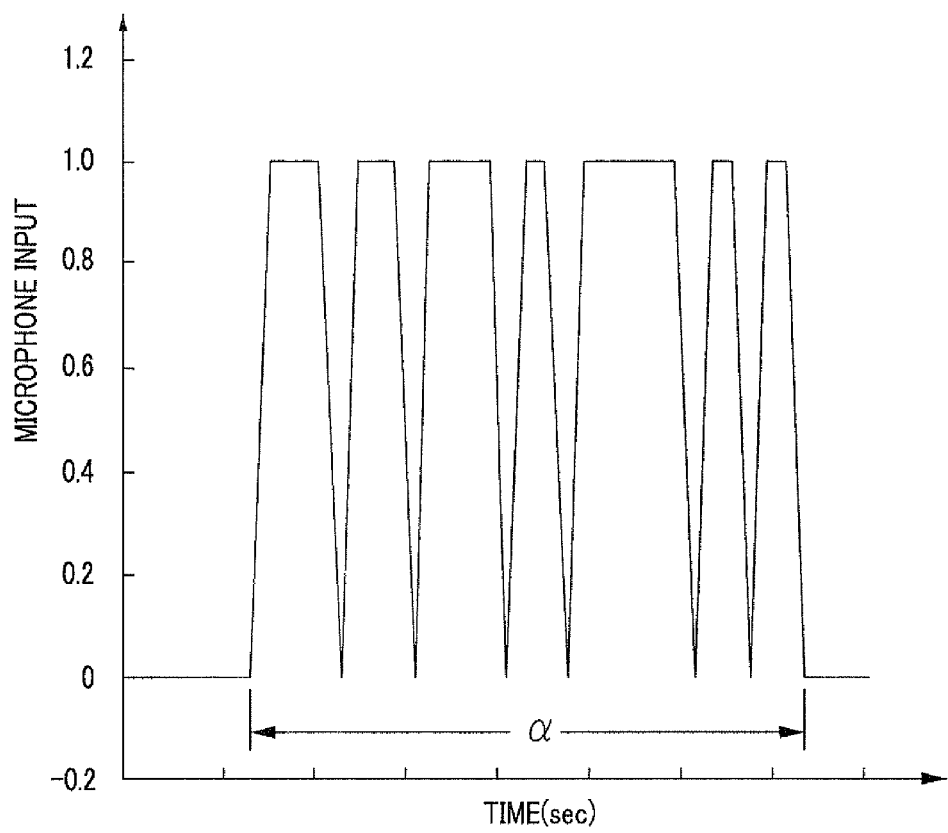
FIGS. 11A and 11B are views showing the sound data when the terminal apparatus in the exemplary embodiment acquires the voice including the collision sound.
Figure 11B:
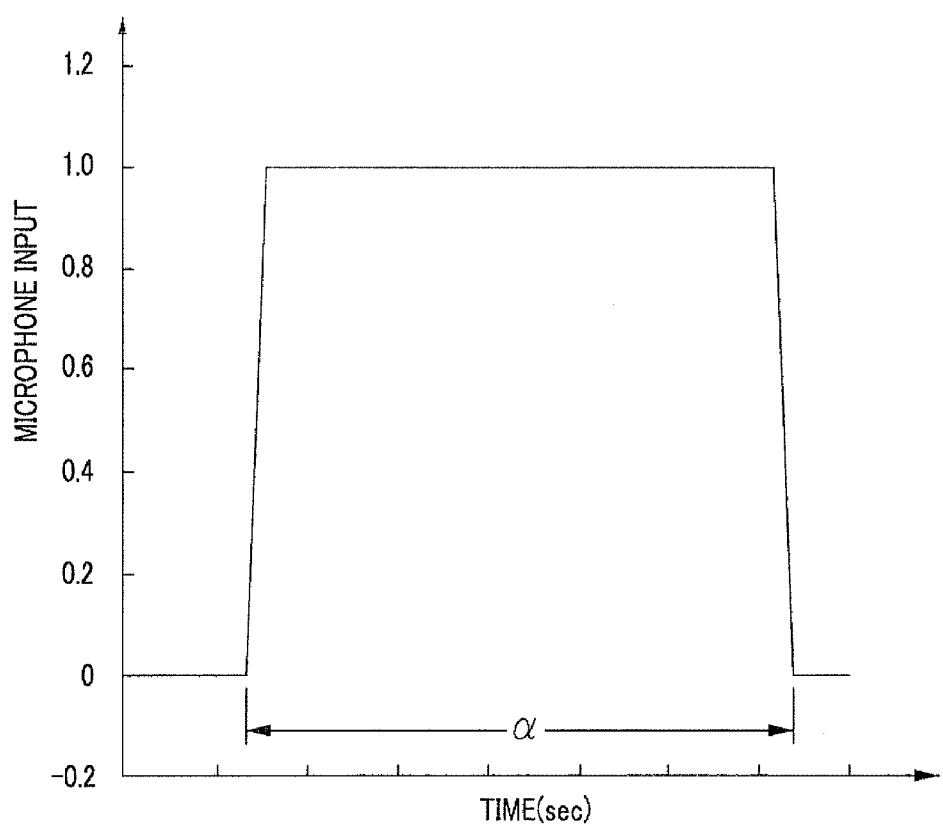

Operation Example of the Voice Analysis Unit 15 That Acquires the Voice Including the Collision Sound Here, an operation example of the voice analysis unit 15 when the voice including the collision sound is acquired will be described. FIGS. 11A and 11B are views showing the sound data when the terminal apparatus 10 in the present exemplary embodiment acquires the voice including the collision sound. Specifically, FIG. 11A is a view showing a change in the microphone input of the microphones 11 and 12 when determination regarding the inclusion of collision sound is not made unlike the present exemplary embodiment, and FIG. 11B is a view showing a change in the microphone input of the microphones 11 and 12 when determination regarding the inclusion of collision sound is made. In addition, in FIGS. 11A and 11B, a case where determination as the voice of the wearer is made is expressed as a microphone input 1, and a case where determination as the voices of others is made is expressed as a microphone input 0.

First, the case where the voice analysis unit 15 does not determine whether or not the acquired voice includes the collision sound unlike the system of the present exemplary embodiment will be described. In this case, when the voice analysis unit 15 analyzes the acquired voice when the collision sound is generated in a section in which the wearer speaks, the analysis result is shown in FIG. 11A. As shown in FIG. 11A, when it is not determined whether or not the acquired voice includes the collision sound, the sound pressure Ga1 of the first microphone 11 becomes large due to the influence of the collision sound. As a result, a section in which determination as the voices of others is made (section in which the microphone input is 0) is caused even though the section is a section (refer to reference numeral α in the drawing) in which the wearer speaks. More specifically, determination as a section with no speaking of the wearer (silence section) is made even though the section is a section in which the wearer speaks.

On the other hand, when the voice analysis unit 15 of the present exemplary embodiment determines whether or not the acquired voice includes the collision sound, the analysis result is shown in FIG. 11B. That is, as shown in FIG. 11B, the voice acquired in a section (refer to reference numeral α in the drawing) in which the wearer speaks is recognized as a voice of the wearer without being influenced by the collision sound. Here, as described above, when the voice analysis unit 15 of the present exemplary embodiment determines that the acquired voice includes the collision sound, distinction between the voice of the wearer and the voices of others is not performed. In addition, for the acquired voice, which is acquired immediately before the acquired voice determined that the collision sound is included, an identification result according to identification of the voice of the wearer and the voices of others continues.

Application Example of a System and Functions of a Host Apparatus

In the system according to the present exemplary embodiment, information regarding the speaking (hereinafter, referred to as speaking information) obtained as described above by the plural terminal apparatuses 10 are collected in the host apparatus 20. Using the information acquired from the plural terminal apparatuses 10, the host apparatus 20 performs various analyses according to the purpose or aspect of use of the system. Hereinafter, an example will be described in which the present exemplary embodiment is used as a system that acquires the information regarding communication of plural wearers.

FIG. 12 is a view showing a situation where plural wearers who wear the terminal apparatus 10 according to the present exemplary embodiment have a conversation with each other. FIG. 13 is a view showing an example of the speaking information of terminal apparatuses 10A and 10B in the conversation situation shown in FIG. 12.

As shown in FIG. 12, a case is considered in which two wearers A and B each of whom wears the terminal apparatus 10 have a conversation with each other. In this case, a voice recognized as wearer's speaking in the terminal apparatus 10A of the wearer A is recognized as another person's speaking in the terminal apparatus 10B of the wearer B. On the contrary, a voice recognized as wearer's speaking in the terminal apparatus 10B is recognized as another person's speaking in the terminal apparatus 10A.

The speaking information is separately transmitted from the terminal apparatuses 10A and 10B to the host apparatus 20. In this case, identification results of a speaker (wearer and another person) in the speaking information acquired from the terminal apparatus 10A and the speaking information acquired from the terminal apparatus 10B are opposite as shown in FIG. 13, but the information showing the speaking situation, such as the length of speaking time or the speaker change timing, is similar. Therefore, the host apparatus 20 in this application example determines that such information items indicate the same speaking situation by comparing the information acquired from the terminal apparatus 10A with the information acquired from the terminal apparatus 10B, and recognizes that the wearers A and B have a conversation. Here, at least the time information regarding the speaking, such as the length of speaking time in each speaking of each speaker, start time and end time of each speaking, and speaker change time (timing), is used as the information showing the speaking situation. In addition, in order to determine the speaking situation related to a specific conversation, only some of the time information regarding the speaking may be used, or other information may be additionally used.

Figure 14:
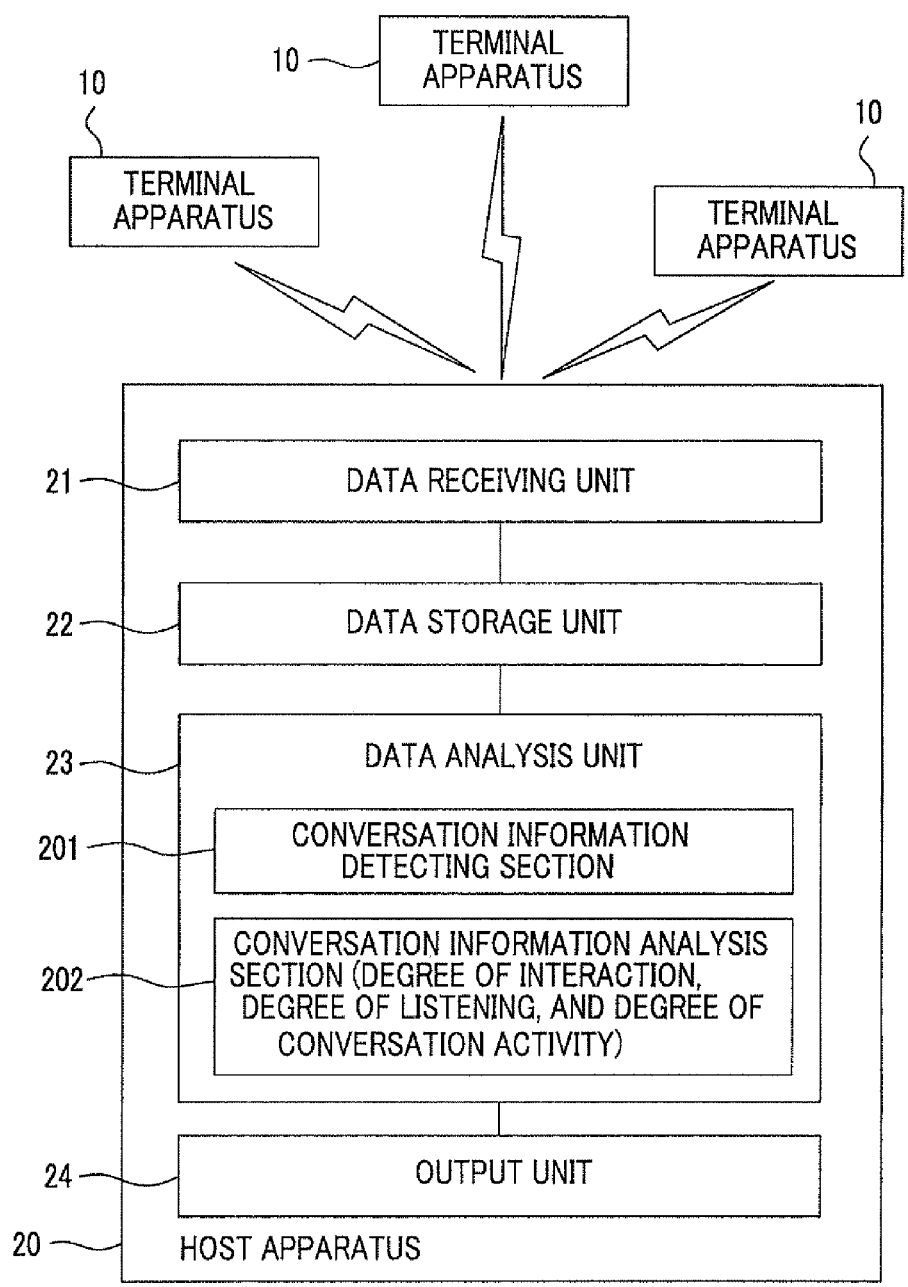
FIG. 14 is a view showing an example of the functional configuration of the host apparatus in the exemplary embodiment.

FIG. 14 is a view showing an example of the functional configuration of the host apparatus 20 in this application example.

In this application example, the host apparatus 20 includes a conversation information detecting section 201 that detects the speaking information (hereinafter, referred to as conversation information) from the terminal apparatus 10 of the wearer in conversation, among the speaking information items acquired from the terminal apparatus 10, and a conversation information analysis section 202 that analyzes the detected conversation information. The conversation information detecting section 201 and the conversation information analysis section 202 are realized as a function of the data analysis unit 23.

Also from the terminal apparatus 10 other than the terminal apparatuses 10A and 10B, the speaking information is transmitted to the host apparatus 20. The speaking information from each terminal apparatus 10 which is received by the data receiving unit 21 is stored in the data storage unit 22. In addition, the conversation information detecting section 201 of the data analysis unit 23 reads the speaking information of each terminal apparatus 10 stored in the data storage unit 22 and detects the conversation information which is the speaking information related to a specific conversation.

As shown in FIG. 13, from the speaking information of the terminal apparatus 10A and the speaking information of the terminal apparatus 10B, the characteristic relationship which is different from the speaking information of other terminal apparatuses 10 is extracted. The conversation information detecting section 201 compares the speaking information that is acquired from each terminal apparatus 10 and is stored in the data storage unit 22, detects the speaking information with the above-described relationship from the speaking information acquired from the plural terminal apparatuses 10, and identifies it as conversation information related to the same conversation. The speaking information from the plural terminal apparatuses 10 is constantly transmitted to the host apparatus 20. Accordingly, the conversation information detecting section 201 determines whether or not the conversation information related to the specific conversation is included by performing the processing as described above while separating the speaking information in a fixed period sequentially, for example.

In addition, the conditions required when the conversation information detecting section 201 detects the conversation information related to a specific conversation from the speaking information of the plural terminal apparatuses 10 are not limited to the relationship shown in FIG. 13 described above. Any detection method may be used as long as it is possible to identify the conversation information related to a specific conversation from plural speaking information items.

In addition, although the case where two wearers each of whom wears the terminal apparatus 10 have a conversation is shown in the above example, the number of persons participating in a conversation is not limited to two persons. When three or more wearers have a conversation, the terminal apparatus 10 worn by each wearer recognizes the voice of the wearer of the host apparatus as the voice of the wearer and distinguishes it from the voices of others (two or more persons). However, the information showing the speaking situation, such as speaking time or speaker change timing, is similar among the acquired information in each terminal apparatus 10. Therefore, similar to the case where two persons have a conversation, the conversation information detecting section 201 detects the speaking information acquired from the terminal apparatuses 10 of wearers participating in the same conversation and distinguishes it from the speaking information acquired from the terminal apparatuses 10 of wearers not participating in the conversation.

Then, the conversation information analysis section 202 analyzes the conversation information detected by the conversation information detecting section 201 and extracts the features of the conversation. In the present exemplary embodiment, as a specific example, the features of the conversation are extracted on the basis of three kinds of criteria for evaluation, that is, the degree of interaction, the degree of listening, and the degree of conversation activity. Here, the degree of interaction is assumed to indicate the balance of the speaking frequency of a conversation participant. The degree of listening is assumed to indicate the degree of listening to others in each conversation participant. The degree of conversation activity is assumed to indicate the density of speaking in the entire conversation.

The degree of interaction is specified by the number of times of speaker changes during the conversation and a variation in time taken until the speaker is changed (time for which one speaker speaks continuously). This may be obtained from the number of times of speaker changes and the time when the speaker change occurs in the conversation information in a fixed period. In addition, it is assumed that the value (level) of the degree of interaction increases as the number of times of speaker changes increases, that is, as a variation in continuous speaking time of each speaker decreases. This criterion for evaluation is common in all conversation information items (speaking information of each terminal apparatus 10) related to the same conversation.

The degree of listening is specified by the ratio of speaking time of each conversation participant and speaking time of others in conversation information. For example, in the following expression, it is assumed that the value (level) of the degree of listening increases as the value of speaking time of others increases.

Degree of listening=(speaking time of others)/(speaking time of a wearer)

This criterion for evaluation differs with the speaking information acquired from the terminal apparatus 10 of each conversation participant even in the conversation information related to the same conversation.

The degree of conversation activity is an index showing the so-called excitement of the conversation, and is specified by the ratio of silence time (time for which none of conversation participants speak) to the total conversation time. It is assumed that the value (level) of the degree of conversation activity increases as the total silence time becomes short (which means that any one of conversation participants speaks in the conversation). This criterion for evaluation is common in all conversation information items (speaking information of each terminal apparatus 10) related to the same conversation.

As described above, the features of a conversation related to the conversation information are extracted by the conversation information analysis of the conversation information analysis section 202. In addition, the way of participation of each participant in the conversation is specified by performing the analysis as described above. In addition, the above criteria for evaluation are just examples showing the features of a conversation, and criteria for evaluation according to the purpose or aspect of use of the system of the present exemplary embodiment may be set by adopting other evaluation criteria or giving a weighting to each item.

The tendency of communication in a group to which the wearer of the terminal apparatus 10 belongs may be analyzed by performing the above analysis for various kinds of conversation information detected by the conversation information detecting section 201 among the speaking information items stored in the data storage unit 22. Specifically, the tendencies of conversation in a wearer's group may be determined by checking the number of conversation participants, conversation time, correlation between the values, such as the degree of interaction and the degree of conversation activity, and the occurrence frequency of conversation, for example.

In addition, the communication tendency of each wearer may be analyzed by performing the analysis as described above for plural conversation information items of a specific wearer. The way of participation of a specific wearer in the conversation may have a certain tendency according to the conditions, such as a conversation partner or the number of conversation participants. Therefore, it may be expected that the features, such as "the speaking level increases in a conversation with a specific partner" or "the degree of listening becomes large if the number of conversation participants increases", are detected by examining the plural conversation information items in a specific wearer.

In addition, the speaking information identification processing and the conversation information analysis processing described above just show the application example of the system according to the present exemplary embodiment, and do not limit the purpose or aspect of use of the system according to the present exemplary embodiment, the function of the host apparatus 20, and the like. The processing function for executing various kinds of analyses and examinations for the speaking information acquired by the terminal apparatus 10 according to the present exemplary embodiment may be realized as a function of the host apparatus 20.

In the above explanation, the voice analysis unit 15 determines whether the acquired voice is a voice of the wearer or voices of others and then determines whether or not the acquired voice includes the collision sound. However, the invention is not limited to this as long as a configuration is adopted in which it is determined whether the acquired voice is a voice of the wearer or voices of others and it is determined whether or not the acquired voice includes the collision sound. For example, it is also possible to adopt a configuration in which it is determined whether or not the acquired voice includes the collision sound and then it is determined whether the acquired voice is a voice of the wearer or voices of others.

In addition, in the above explanation, when the voice analysis unit 15 determines that the acquired voice includes the collision sound, distinction between the voice of the wearer and the voices of others is not performed. However, the invention is not limited to this. For example, it is also possible to adopt a configuration in which the voice analysis unit 15 determines that the acquired voice includes the collision sound and then the voice analysis unit 15 removes noise from the voices acquired by the first and second microphones 11 and 12 (performs filtering processing) and also determines that the voice of the wearer has been acquired at the acquisition time of this acquired voice. In this case, determining the acquired voice, which is the voice of the wearer, to be the voices of others is suppressed.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. A voice analyzer comprising:
   an apparatus body;
   a strap that is connected to the apparatus body and is used to hang the apparatus body from a neck of a user;
   a first voice acquisition unit that is provided in the strap or the apparatus body in order to acquire a voice;
   a second voice acquisition unit that is provided at a position where a distance of a sound wave propagation path from a mouth of the user is smaller than a distance of a sound wave propagation path from the mouth of the user to the first voice acquisition unit when the strap is hung on the neck of the user and that acquires a voice; and
   an identification unit that identifies a sound, in which second sound pressure that is sound pressure of a voice acquired by the second voice acquisition unit is larger by a predetermined value than first sound pressure that is sound pressure of a voice acquired by the first voice acquisition unit, on the basis of a result of comparison between the first sound pressure and the second sound pressure,
   wherein the identification unit identifies whether the voices acquired by the first and second voice acquisition units are voices of the user, who has the strap hung on the neck, or voices of others on the basis of the comparison result between the first sound pressure and the second sound pressure.

2. The voice analyzer according to claim 1,
   wherein the first voice acquisition unit is provided in the apparatus body, and
   the second voice acquisition unit is provided in the strap.

3. A voice analyzer comprising:
   an apparatus body;
   a strap that is connected to the apparatus body and is used to hang the apparatus body from a neck of a user;
   a first voice acquisition unit that is provided in the strap or the apparatus body in order to acquire a voice;
   a second voice acquisition unit that is provided at a position where a distance of a sound wave propagation path from a mouth of the user is smaller than a distance of a sound wave propagation path from the mouth of the user to the first voice acquisition unit when the strap is hung on the neck of the user and that acquires a voice; and
   an identification unit that identifies a sound, in which second sound pressure that is sound pressure of a voice acquired by the second voice acquisition unit is larger by a predetermined value than first sound pressure that is sound pressure of a voice acquired by the first voice acquisition unit, on the basis of a result of comparison between the first sound pressure and the second sound pressure, wherein the identification unit identifies whether the voices acquired by the first and second voice acquisition units are voices of the user, who has the strap hung on the neck, or voices of others on the basis of a result of comparison between the first sound pressure and the second sound pressure for another sound identified by the identification unit.

4. The voice analyzer according to claim 2, wherein the identification unit identifies whether the voices acquired by the first and second voice acquisition units are voices of the user, who has the strap hung on the neck, or voices of others on the basis of a result of comparison between the first sound pressure and the second sound pressure for another sound identified by the identification unit.

5. The voice analyzer according to claim 1, wherein the identification unit identifies whether the voices acquired by the first and second voice acquisition units are voices of the user, who has the strap hung on the neck, or voices of others on the basis of a result of comparison between the first sound pressure and the second sound pressure for another sound identified by the identification unit.

* * * * *